(12) United States Patent
Isogai et al.

(10) Patent No.: US 7,289,892 B2
(45) Date of Patent: Oct. 30, 2007

(54) POWER TRAIN INSPECTION SYSTEM, POWER TRAIN INSPECTED BY POWER TRAIN INSPECTION SYSTEM, AND CONTROL UNIT FOR POWER TRAIN

(75) Inventors: Akira Isogai, Anjo (JP); Masahiko Ando, Anjo (JP); Naoyuki Fukaya, Anjo (JP); Takayuki Kubo, Anjo (JP); Masao Saitou, Anjo (JP); Yuji Imanaga, Anjo (JP); Satoshi Yoshida, Anjo (JP); Masato Matsubara, Toyota (JP); Norimi Asahara, Toyota (JP); Katsumi Kono, Toyota (JP); Tomokazu Inagawa, Toyota (JP); Hideki Takamatsu, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 296 days.

(21) Appl. No.: 10/739,392

(22) Filed: Dec. 19, 2003

(65) Prior Publication Data
US 2004/0186637 A1 Sep. 23, 2004

(30) Foreign Application Priority Data
Dec. 27, 2002 (JP) ............................. 2002-381370

(51) Int. Cl.
*G01M 17/00* (2006.01)
*G06F 7/00* (2006.01)
*G06F 19/00* (2006.01)

(52) U.S. Cl. ........................... 701/29; 701/51; 73/116; 73/117.1; 73/117.3

(58) Field of Classification Search ............... 701/29, 701/51; 73/116, 117.3, 117.1; 475/117, 475/127; 472/122
See application file for complete search history.

(56) References Cited

U.S. PATENT DOCUMENTS

| | | | | |
|---|---|---|---|---|
| 3,796,092 | A * | 3/1974 | Klinger et al. | 73/794 |
| 4,257,441 | A * | 3/1981 | Iwanaga et al. | 137/116.3 |
| 4,362,055 | A * | 12/1982 | Grobler | 73/162 |
| 5,060,176 | A * | 10/1991 | Nawa et al. | 701/51 |
| 5,456,647 | A | 10/1995 | Holbrook | 477/154 |
| 5,471,871 | A * | 12/1995 | Rogers | 73/118.1 |
| 6,155,948 | A * | 12/2000 | Gierer | 475/123 |
| 6,343,504 | B1 * | 2/2002 | Shultz | 73/118.1 |
| 6,393,943 | B1 | 5/2002 | Sommer et al. | 74/606 |

(Continued)

*Primary Examiner*—Thomas Black
*Assistant Examiner*—Marie A. Weiskopf
(74) *Attorney, Agent, or Firm*—Bacon & Thomas, PLLC

(57) ABSTRACT

The present invention provides inspection of a transmission with higher precision and in a shorter period of time. Before a finished A/T is inspected, a V/B ASSY and an ECU are inspected together by a V/B tester in a subsidiary line. A solenoid current command value (a characteristic value inherent in the A/T) for a linear solenoid of the V/B ASSY is corrected and written into the ECU through CAN communication. Spring load of a return spring SP and stroke of the piston of a hydraulic servo for a frictional engagement element are measured. Actually measured values or corrected values of the spring load and the stroke are stored. In the final inspection of the A/T a finished-product tester reads the stored characteristic values and transmits them to the ECU integrated with the A/T through CAN communication. The characteristic values are then written into the ECU. The finished-product tester inspects the finished A/T product, using the characteristic values thus written into the ECU.

40 Claims, 13 Drawing Sheets

U.S. PATENT DOCUMENTS 6,807,852 B2 * 10/2004 Ranchin .................... 73/118.1
2002/0023483 A1 * 2/2002 Reinisch et al. .............. 73/116
2004/0210372 A1 * 10/2004 Coutant ...................... 701/51

* cited by examiner

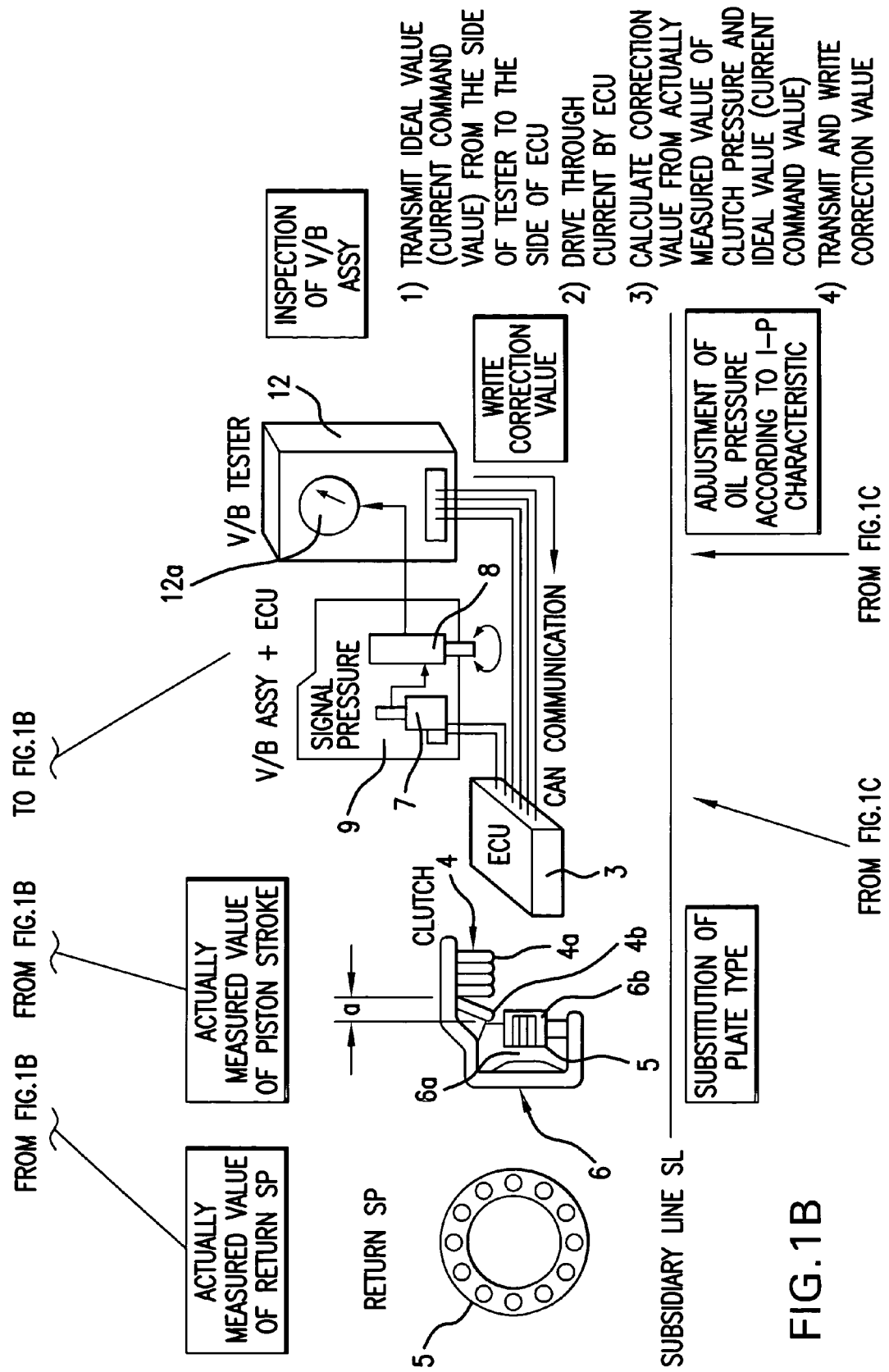

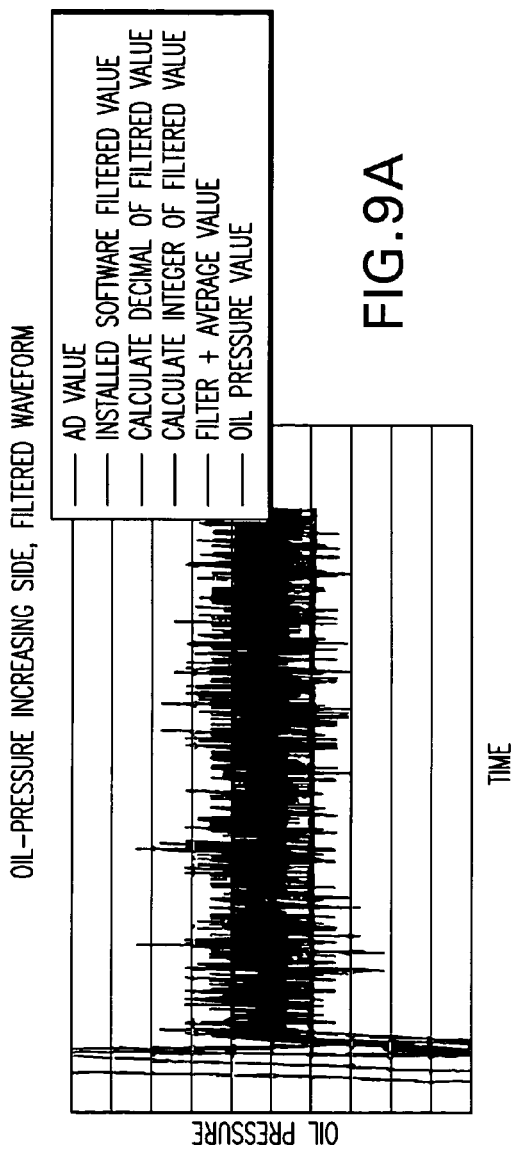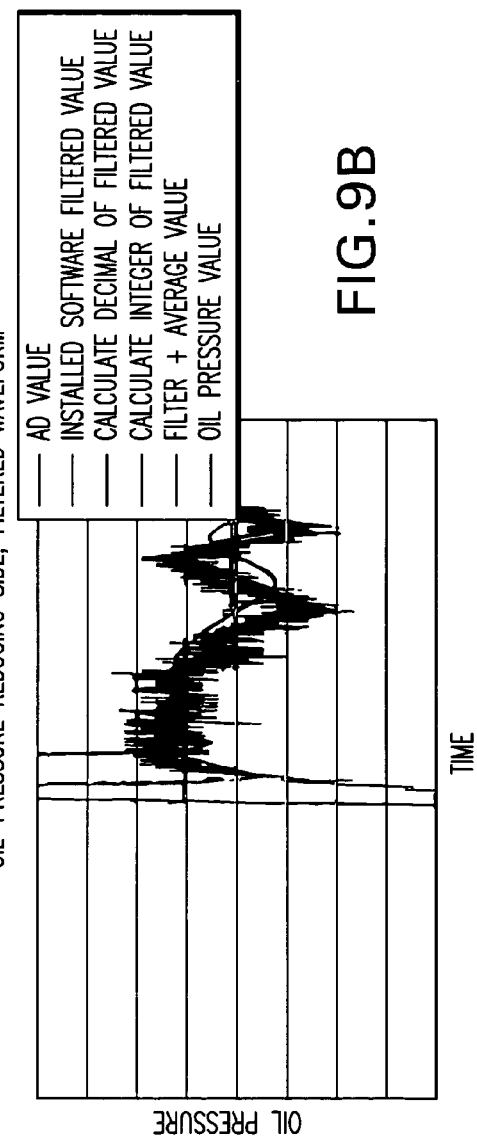

POWER TRAIN INSPECTION SYSTEM, POWER TRAIN INSPECTED BY POWER TRAIN INSPECTION SYSTEM, AND CONTROL UNIT FOR POWER TRAIN

INCORPORATION BY REFERENCE

The disclosure of Japanese Patent Application No. 2002-381370 filed on Dec. 27, 2002, including its specification, drawings, and abstract is incorporated herein by reference in its entirety.

CROSS-REFERENCE TO RELATED APPLICATIONS

This application claims, under 35 USC 119, priority of Japanese Application No. 2002-381370 filed Dec. 27, 2002.

BACKGROUND OF THE INVENTION

1. Field of the Invention

The present invention relates to an inspection system for inspecting a power train employed in an automobile or the like, to a power train including such an inspection system, and to a control unit for the power train. The term "power train" as used herein is intended to include an automatic transmission (hereinafter also referred to as an A/T), a continuously variable transmission (hereinafter also referred to as a CVT), a semiautomatic transmission, an electric motor serving as a drive of a vehicle, an engine and an electric motor installed in a hybrid vehicle, and the like.

2. Related Art

U.S. Pat. No. 5,456,647 discloses driving an engine to rotate a turbine and to operate actuators of frictional engagement elements with rotational speed of the engine being held constant so as to learn characteristics of all the frictional engagement elements, wherein strokes of the actuators are determined upon detection of a drop in rotational speed of the turbine where frictional engagement elements are regarded as having reached a torque-transmitting state, and wherein values of the strokes are stored in memory for future use in gearshift control of the A/T.

Japanese Patent Publication No. 2001-502405 discloses a method including the steps of determining the time required for filling a clutch actuator with oil, pressure of the oil, and reaction time from change of an input rotational speed, output rotational speed, input torque, output torque, and time of the final bench test of an A/T. The disclosed method further includes correcting the timing of piston stroke pressure, timing for holding pressure, and timing of switching pressure, storing the corrected values in memory during the bench test, and causing a control unit of the A/T to read the corrected values and to use the corrected values for gearshift control of the A/T after the A/T has been installed in the automobile.

German Patent Application Laid-Open No. 19-943,069 discloses a control unit which measures and detects pressure tolerance in an operational range, derives a correction value as deviation from a reference characteristic curve, and writes the correction value into memory.

In the automatic transmission control system disclosed in U.S. Pat. No. 5,456,647, after the automatic transmission has been fabricated, all the frictional engagement elements are tested and values thus obtained are stored in memory. Hence, in order to learn the characteristics of all the frictional engagement elements, the same operation has to be repeated many times. This creates a problem because it takes a long time to finish final inspection of the newly assembled automatic transmission.

Further, since final inspection of the automatic transmission is conducted with the A/T installed in the vehicle, the automobile plant requires space devoted to learning the characteristics of the frictional engagement elements. Even if the charcteristics of the frictional engagement elements are learned before the A/T is installed in the vehicle, a dedicated space is required.

Japanese Laid-Open Application No. 2001-502405 discloses such learning implemented in the final bench test with of the newly fabricated automatic transmission before installation in an automobile, a problem more or less similar to that described in connection with the aforementioned U.S. Pat. No. 5,456,647 is encountered.

German Patent Application Laid-Open No. 19943069 discloses an automatic transmission control unit that can appropriately correct characteristic values at certain points but not at other points. Thus, this control unit cannot always control the A/T with high precision.

SUMMARY OF THE INVENTION

Accordingly, it is an object of the present invention to provide a power train inspection which does not require a dedicated space but allows inspection for learning characteristics of the power train to be conducted in the shortest possible period of time, to provide a power train capable of performing gearshift control with higher precision, and to provide a control unit capable of controlling the power train with higher precision.

In order to achieve the above-stated objectives, according to a first aspect, the present invention provides a power train inspection system including a parts tester for acquiring values for characteristics of components of the power train before the power train is inspected as a finished product, a storage medium for storing the characteristic values obtained from the parts tester, and a finished-product tester for inspecting the power train as a finished product with comparison against the characteristic values stored in the storage medium in the process of inspecting the power train.

The power train inspection system of the first aspect of the present invention may be modified such that the power train as a finished product is an aggregate of component assemblies with an assembly tester provided to determine characteristic values of those assemblies which are composed of components whose individual characteristic values have not been acquired.

The power train inspection system of the first aspect of the present invention may also be modified such that the finished power train is an aggregate of component assemblies each of which is an aggregate of single components. In such an embodiment an assembly tester is provided which acquires a characteristic value of at least one part belonging to one of the assemblies and further acquires the characteristic values of the assemblies using the characteristic value of the at least one part.

The power train inspection system may be equipped with a control unit for controlling the power train and which acquires characteristic values of the components, component assemblies, and/or the power train as a finished product.

The power train inspection system of the first aspect of the present invention may have the control unit driven by a drive signal transmitted from the assembly tester, to acquire a characteristic value by outputting a control signal to a driven mechanism in an assembly in accordance with the drive signal, wherein the characteristic value is an oil pressure output from the driven mechanism in response to the control signal.

Characteristic values stored in a storage medium may be written into the control unit before the power train as a finished product is inspected by the finished product tester. Alternatively, the finished-product tester writes characteristic values from the storage medium into the control unit while inspecting the power train during finished product inspection.

According to a second aspect of the present invention, the power train inspection system comprises a parts tester for acquiring characteristic values of the components of the power train before the power train receives a final inspection, a control unit for controlling the power train and storing characteristic values obtained from the parts tester, and a finished-product tester for conducting a final inspection of the power train using the characteristic values stored in the control unit.

In the second aspect of the present invention the power train subjected to final inspection as a finished product may be tested an aggregate of assemblies such as a valve body assembly with the assemblies being aggregates of single parts such as a solenoid, a valve, a valve body case, and the like. In this embodiment the assembly tester acquires characteristic values for those assemblies which are composed of parts for which characteristic values have not been acquired.

In accordance with the second aspect of the invention the assembly tester acquires a characteristic value of at least one part belonging to one of the assemblies, and the characteristic values of the assemblies are acquired by the assembly tester using the characteristic value of the one part.

Also in the second aspect of the present invention the control unit may acquire the characteristic values associated with the parts, the assemblies, and/or the power train as finished product.

The control unit may be driven by a drive signal transmitted from the assembly tester, and may acquire a characteristic value by outputting a control signal to a driven mechanism of the assembly, in accordance with the drive signal, where the characteristic value is an oil pressure output from the driven mechanism in response to the control signal.

In a third aspect of the present invention, the power train comprises a control unit for controlling the power train inspected by the power train inspection system of the first or second aspect of the present invention. The control unit uses the characteristic values written therein to perform gearshift control.

According to a fourth aspect of the present invention, the power train comprises a control unit for controlling the power train inspected by the power train inspection system of the first or second aspect of the present invention. The control unit is shipped after having been integrated with the power train.

According to a fifth aspect of the present invention, the control unit controls the power train inspected by the power train inspection system of the first or second aspect of the present invention in accordance with the characteristic values written into the control unit.

In the power train inspection system of the first and second aspects of the present invention and in some modifications thereof, before the finished power train product is inspected, the characteristic of the parts constituting the power train, the characteristic of each of the assemblies (aggregates of parts), and the characteristic of the aggregate of the assemblies are measured by the parts tester or by the assembly tester, and characteristic values thus obtained are corrected if necessary. The characteristic values or the corrected characteristic values are stored in a the storage medium, such as an ID card or the like, as characteristic values inherent to the power train. In inspecting the finished power train the characteristic values of the power train stored in the storage medium are used.

In the power train inspection system of the second aspect of the invention and in some modifications thereof, before inspection of the finished power train, the characteristic values of the parts constituting the power train, the characteristic of each of the assemblies of parts, and the characteristic of the aggregate of the assemblies are measured by the parts tester or the assembly tester, and characteristic values thus obtained are corrected if necessary. The characteristic values or the corrected characteristic values are stored in the control unit which controls the power train, as characteristic values inherent in the power train. In the inspection of the finished power train the characteristic values of the power train stored in the storage medium are used. Because the final inspection uses the characteristic values which are inherent in the power train and which have been measured and corrected before the final inspection, the final inspection involves substantially no more than inspection and, accordingly, the time required for the final inspection of the power train can be shortened. Further, because degrees of variation in these characteristic values or the corrected values thereof are reduced, the power train can be inspected with high precision. Thus, power trains with a reduced degree of variation in shift quality can be produced without an increase in the incidence of rejected products. Moreover, since the degree of variation in shift quality has been reduced, the final inspection can be conducted with a FF control initial pressure during lock-up control being held more or less equal to a design value. Thus, in actual use of the vehicle, noise associated with lock-up slip can be suppressed.

As previously described, final inspection of the power train can be conducted with high precision. Therefore, almost no problem results if final inspection of the power train is conducted without installing the power train in a vehicle. Accordingly, there is no need to dedicate a space for learning the power train in an automobile plant.

Furthermore, since the characteristic values of the parts, the part assemblies, and the aggregate of the part assemblies or the corrected values thereof are stored in a storage medium, the storage medium can be easily transported to a location for inspecting finished products.

In accordance with the first aspect of the present invention, since the characteristic values of the assemblies are acquired, the process of testing the parts within those assemblies can be omitted.

In another modification of the first aspect of the invention, the characteristic values of the parts are acquired. Therefore, if the power train is regarded as unacceptable in the final inspection or if a certain assembly is regarded as unacceptable in the inspecting of the assemblies, it is possible to identify the defective part within the unacceptable assembly.

In some of the modifications of the first and second aspects of the present invention, characteristic values of the parts are stored within the control unit associated and paired (correlated) with the parts, the assemblies, and/or the power train as a finished product and inspection is conducted. Therefore, inspection can be conducted with higher precision. Accordingly, the power train that is shipped from the plant after having been accepted in this high-precision inspection has superior quality.

In using the power train according to the third and fourth aspects of the present invention, gearshift control is performed using the characteristic values of the power train which have been written into the control unit, which have been corrected, and whose degrees of variation have been reduced. Thus, the gearshift control of the power train can be performed with high precision from an early stage, and the sensation associated with a gearshift can be improved. The amount of learning required for the power train can be reduced as well.

Especially according to the fourth aspect of the invention, since the power train is shipped from the plant after having been integrated with the control unit, there is no danger that the control unit might be installed improperly, and the gearshift control of the power train can be performed with high precision from an early stage. Also, the learning of the power train can be carried out with higher precision such that performance required of the power train is guaranteed.

Moreover, the control unit of the power train according to the fifth aspect of the present invention controls the power train using the characteristic values of the power train, which have been written into the control unit and whose degrees of variation have been reduced. Thus, the power train can be controlled with high precision.

BRIEF DESCRIPTION OF THE DRAWINGS

FIG. 9 illustrates determination of actual values of oil pressures measured by a pressure gauge of the V/B tester and a pressure gauge of the finished-product inspection tester, respectively.

DETAILED DESCRIPTION OF PREFERRED EMBODIMENT

Hereinafter, an embodiment of the present invention will be described with reference to the drawings.

Figure 1A:
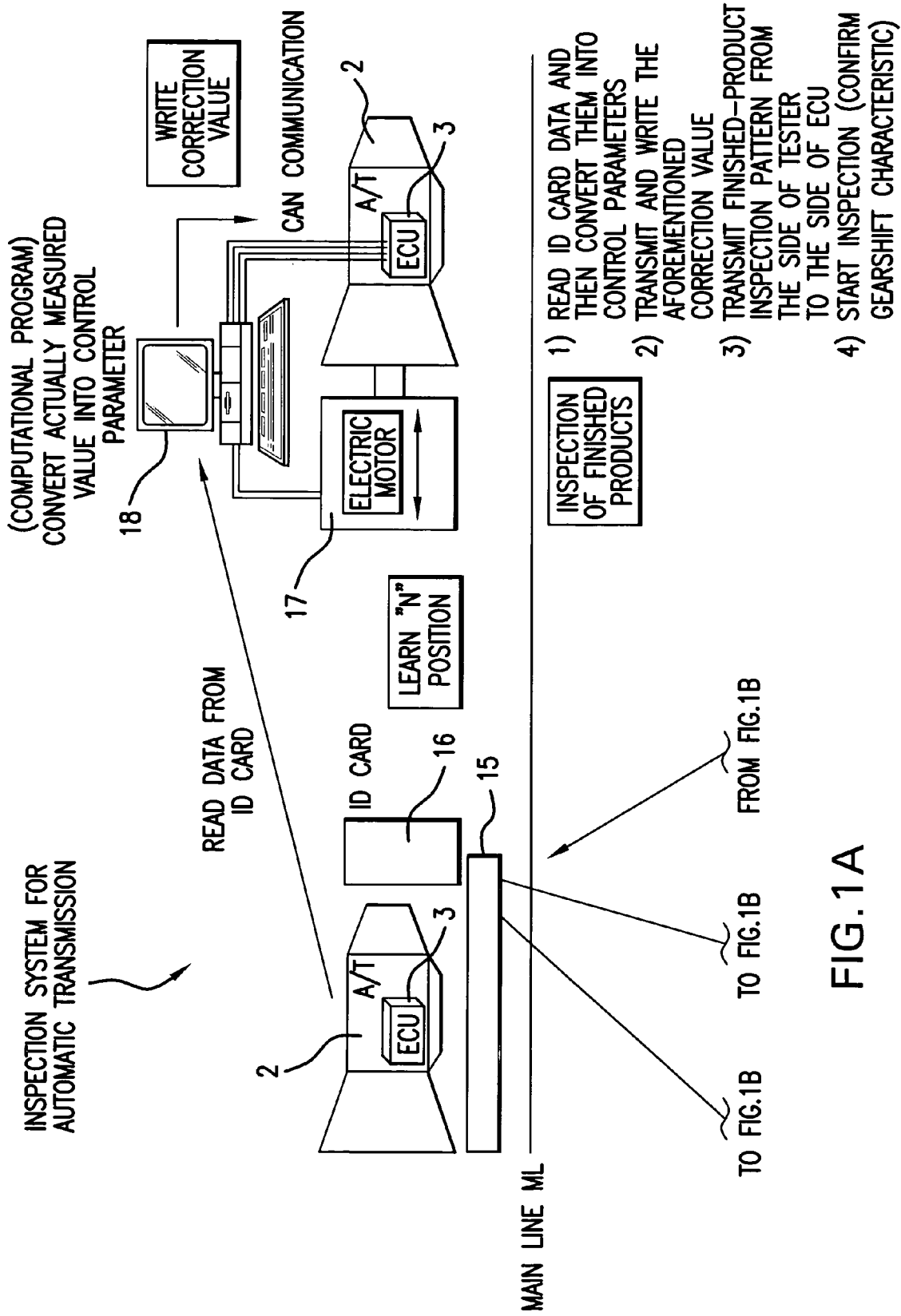
FIG. 1 is a schematic diagram of an embodiment of a power train inspection system in accordance with the present invention which is applied to an automatic transmission.
Figure 1C:
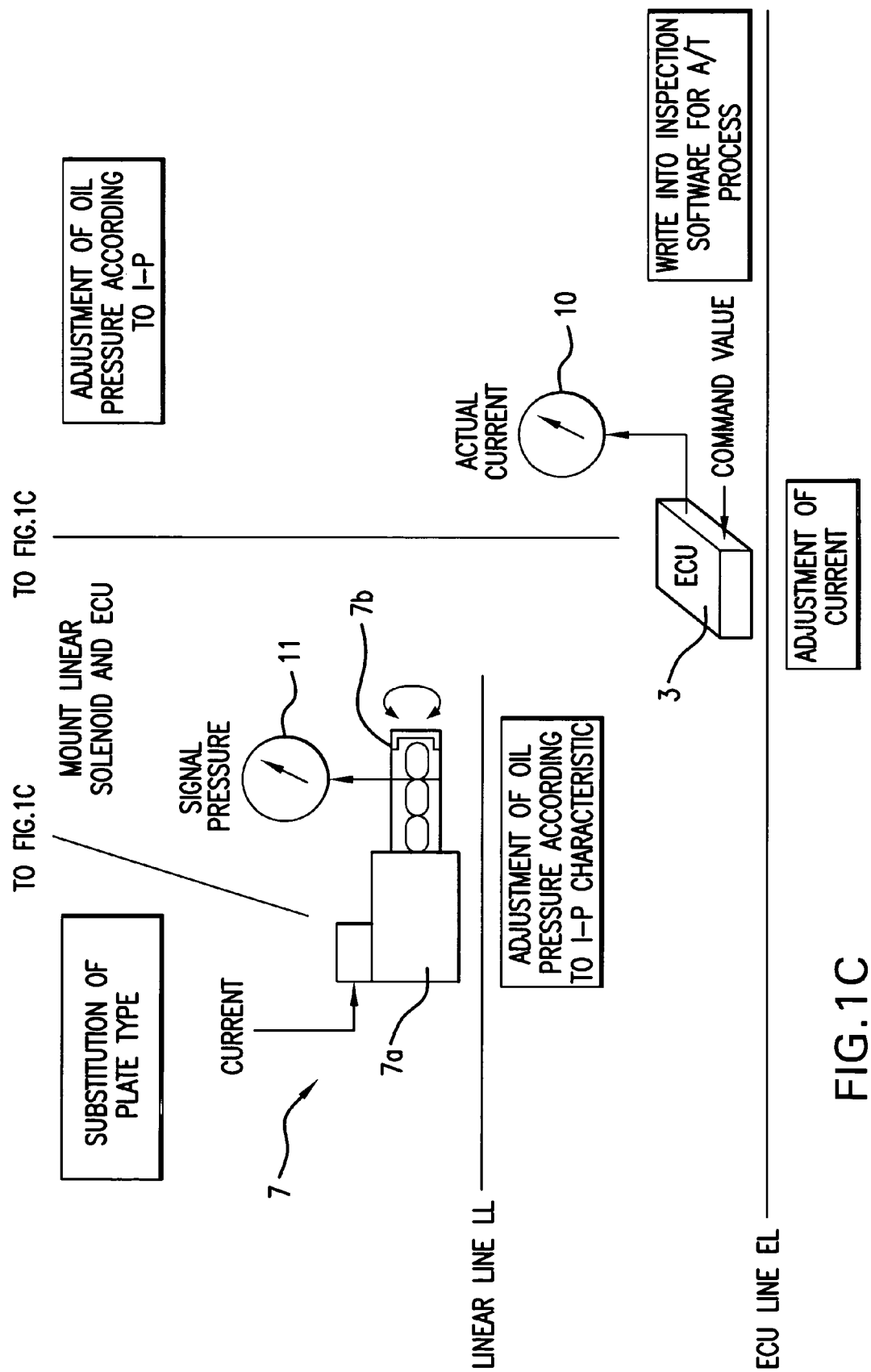

FIG. 1 is a schematic diagram of an embodiment of a power train inspection system of the present invention which is applied to an automatic transmission. In the present invention, "inspection of a finished product" refers to a final inspection of a completely assembled transmission as shipped from a plant. "Parts" constituting the transmission include single parts such as a return spring and aggregate parts such as a frictional engagement element assembly (ASSY), a valve body assembly (ASSY) 9, and the like. Single parts such as a clutch drum, a brake drum, a plate, a snap ring, a piston and the like are assembled into the frictional engagement element assembly (ASSY). Similarly, single parts are assembled into the valve body assembly (ASSY) 9. Furthermore, a "characteristic value" is an actually measured value obtained through measurement of parts or correction values obtained from a later-described pattern (e.g., see FIG. 5). A learning value refers to a value that is learned and corrected with respect to a characteristic value or a correction value thereof, for example, where a user drives a vehicle after shipment of a power train.

As shown in FIG. 1, this embodiment is an inspection system 1 for an A/T 2 that is integrated with an electronic control unit (hereinafter referred to also as an ECU) 3 as a control unit for controlling the A/T 2. The power train inspection system 1 is composed of a main line ML, a subsidiary line SL, a linear line LL, and an ECU line EL. In the main line ML, a completed A/T 2 is fabricated. In the subsidiary line SL, frictional engagement elements 4 such as clutches, brakes and the like of the A/T 2 are assembled with a hydraulic servo 6, which engages the frictional engagement elements 4 responsive to oil pressure supplied thereto and releases the frictional engagement elements 4 by draining of the oil pressure with the aid of the force of a return spring (hereinafter referred to also as a return SP) 5. Also, in the subsidiary line SL, a linear solenoid valve 7 and various valves 8 are assembled to form the valve body assembly (hereinafter referred to also as a V/B ASSY) 9, and the V/B ASSY is inspected. In the linear line LL, which is in a different plant than that where the A/T 2 is fabricated, the linear solenoid valve 7 is fabricated, and an oil pressure is adjusted according to a current-oil pressure characteristic (hereinafter referred to also as an I-P characteristic) of the linear solenoid valve 7. In the ECU line EL, which is also in a plant different from that where the A/T 2 is fabricated, an ECU 3 is fabricated.

In this example, the main line ML, the subsidiary line SL, the linear line LL, and the ECU line EL are located in different plants respectively. However, the present invention is not so limited. More specifically, it is appropriate that all the lines ML, SL, LL, and EL be located in a single plant or that two or three of the lines ML, SL, LL, and EL be located in a single plant.

In the ECU line EL, a current value of the ECU 3 is adjusted. Preliminary to the description of adjustment of current value of the ECU 3 in accordance with the present invention, adjustment of a current value of the ECU 3 in accordance with the related art will be described. In the related art, for inspection of the ECU 3 after completion of its fabrication, a current command value is input to a drive circuit of the ECU 3, and an actual current value output from the drive circuit of the ECU 3 is measured by an ammeter 10. Any error in the actual current value is corrected such that the measured actual current value becomes equal to the input current command value or to a predetermined value corresponding to the current command value. A correction value for this correction (a characteristic value of the ECU 3) is stored in the ECU 3, whereby a current value of the ECU 3 is adjusted. In this case, the ECU 3 and the A/T 2, which are constructed as separate components, are interfaced with each other for the first time in an automobile plant where the A/T 2 is mounted in a vehicle. For this reason, there is no alternative but to allow only the ECU 3 to store the characteristic value. In adjusting a current value of the ECU in accordance with the related art, the ECU 3 is held apart from the A/T 2 in the ECU line EL, and the ECU 3 and the A/T 2 are put together and inspected for the first time in the final inspection of the A/T 2 as a finished product. Therefore, a strict standard is set for adjustment of a current value of the ECU. In addition, since the actual current value of the ECU 3 changes in dependence upn the current command value, it is relatively difficult to adjust a current value of the ECU 3.

On the other hand, according to the inspection system 1 of the A/T 2 of the present invention, one of the following three methods (a) to (c) is adopted to adjust the current value of the ECU 3 in the ECU line EL.

(a) Measurement of an actual current value of the ECU 3 and adjustment of a current value of the ECU 3 are carried out in the same manner as in the aforementioned related art. In the inspection system 1 for the A/T 2 in accordance with the present invention, however, for adjustment of the current value, overall fine adjustment of the V/B ASSY 9 is carried out later by means of the ECU 3 as will be described later. Therefore, in comparison with adjustment of the current value of the ECU 3 according to the related art, a less strict standard is set, so that a coarse adjustment (rough adjustment) is made. An error in coarse adjustment, as a difference between an actual current value and a current command value or a predetermined value corresponding to the current command value, is stored as a correction value (a characteristic value of the ECU 3) either directly into the ECU 3 or into a later-described storage medium 16 such as an ID card, a bar code, or the like.

As described above, no more than coarse adjustment is required in adjusting the ECU 3. Thus, the drive circuit of the ECU 3 can be made less expensive as compared with the related art, and the ECU 3 can be adjusted more easily and more quickly in comparison with the related art.

(b) Measurement of an actual current value of the ECU 3 and adjustment of a current value of the ECU 3 are carried out in the same manner as in the aforementioned related art. The same standard as in the aforementioned related art is used for adjustment of a current value. However, as in the case of the related art, a characteristic value of the ECU 3 is stored either directly into the ECU 3 or into the later-described storage medium 16 such as an ID code, a bar code, or the like. This further simplifies the later-described operation of finely adjusting the ECU 3 and the V/B ASSY 9 together.

(c) The actual current value of the ECU 3 is not measured but is adjusted using the ECU 3 and the V/B ASSY 9. In this case, since measurement of the ECU 3 itself is omitted, the time required for inspection can be reduced.

In the ECU line EL, inspection software for a program for inspecting the A/T is written into the ECU 3. This inspection software can be used in common for both a later-described routine of inspecting the V/B ASSY and a later-described routine of inspecting the finished product.

Figure 2:
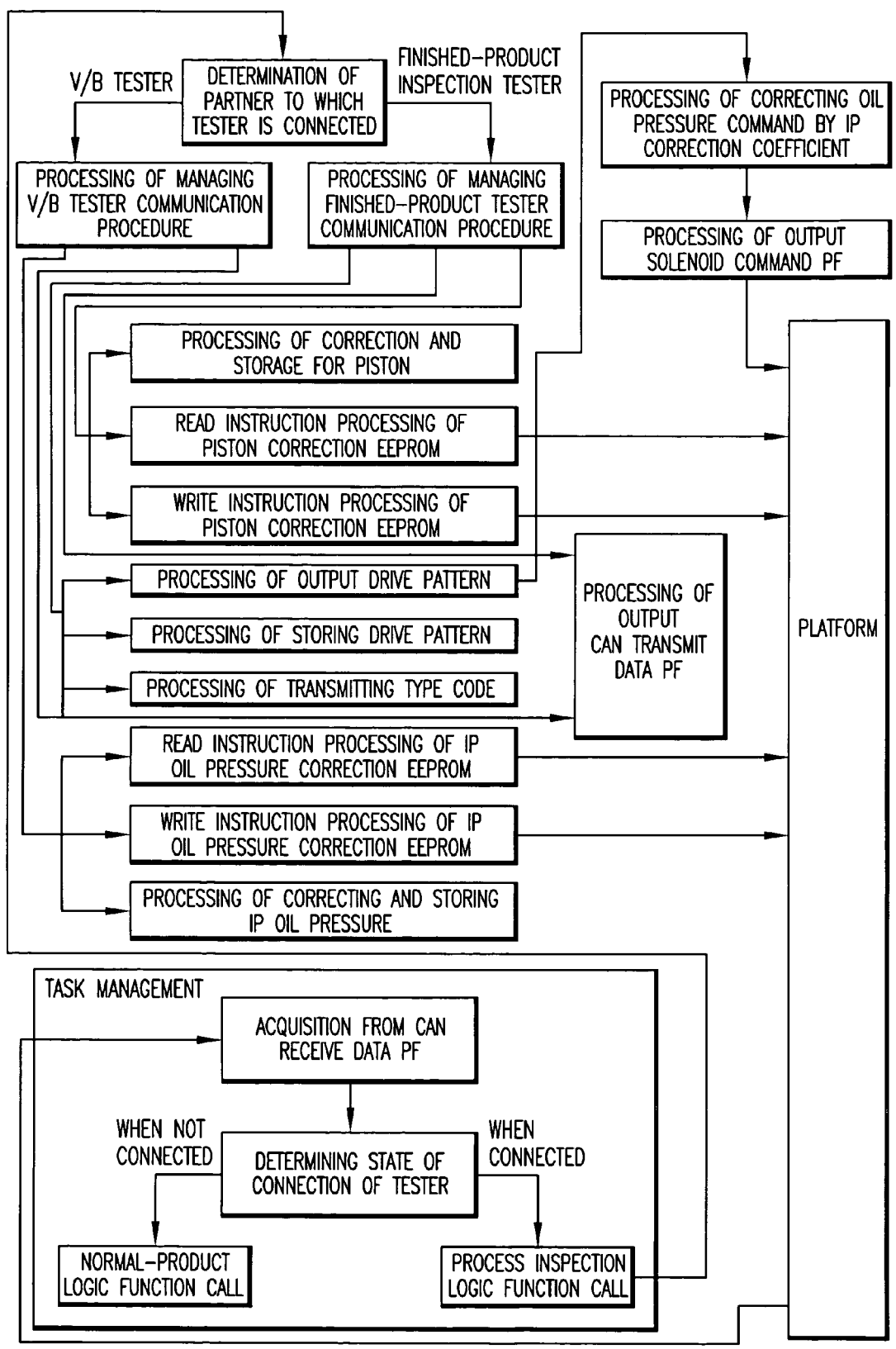
FIG. 2 illustrates the basic structure of inspection software used in the inspection system for an automatic transmission of the embodiment of FIG. 1.

As shown in FIG. 2, the basic structure of this inspection software includes a platform, task management, and various programs.

In task management, an acquisition program, a tester connection determination program, a process inspection logic function call, and a normal product logic function call all utilize CAN received data PF. That is, in task management, the CAN received data PF is acquired in accordance with an output signal transmitted from the platform, and it is determined from the data PF whether or not the ECU 3 is connected to a tester. If it is determined that the ECU 3 is connected to the tester, a process inspection logic function is invoked. If it is determined that the ECU 3 is not connected to the tester, a normal product logic function is invoked.

In the aforementioned programs, if the process inspection logic function is used, it is determined to which component the tester is connected. If it is determined that the V/B tester is connected to the ECU 3, a V/B tester communication procedure management program is executed. In running the V/B tester communication procedure management program, an IP oil pressure correction storage routine for the I-P characteristic, an IP oil pressure correction EEPROM write instruction routine and an IP oil pressure correction EEPROM read instruction routine are executed. By execution of these routines, a write instruction and a read instruction are output to the platform.

In addition, common routines which also used where the later-described finished-product inspection tester is connected to the ECU 3, namely, a CAN transmitted data PF output routine, a type code transmission routine, a drive pattern storage routine, and a drive pattern output routine are executed. In the CAN transmitted data output routine, CAN transmitted data PF is output to the platform. In the drive pattern output routine, a drive pattern is output. Responsive to output of a drive pattern, an oil pressure command correction routine based on an IP correction coefficient is executed. This routine for oil pressure command correction outputs an oil pressure correction command. Responsive to output of the oil pressure correction command, a solenoid command PF output routine is executed to output a solenoid command PF to the platform.

On the other hand, if it is determined that the finished-product inspection tester is connected to the ECU 3, a finished-product inspection tester communication procedure management program is executed. In the finished-product inspection tester communication procedure management routine, a piston correction storage routine, a piston correction EEPROM write instruction routine and a piston correction EEPROM read instruction routine are executed to output a write instruction and a read instruction to the platform.

Moreover, as in the aforementioned case where the V/B tester is connected to the ECU 3, the CAN transmitted data PF output routine, the type code transmission routine, the drive pattern storage routine, the drive pattern output routine, the oil pressure command correction routine based on the IP correction coefficient, and the solenoid command PF output routine are executed.

As shown in FIG. 1, in the linear line LL, a linear solenoid 7a and a valve 7b are assembled into the linear solenoid valve 7.

In the linear line LL, the characteristic of pressure P as a function of a current I (i.e., an I-P characteristic) in the linear solenoid valve 7 is adjusted.

Preliminary to a description of adjustment of the I-P characteristic of the linear solenoid valve 7 in accordance with the present invention, adjustment of the I-P characteristic of the linear solenoid valve 7 in accordance with the related art will be described.

In the related art adjustment of the I-P characteristic of the linear solenoid valve 7, a predetermined current is supplied to the linear solenoid 7a of the assembled linear solenoid valve 7, and a signal pressure output from the linear solenoid valve 7 is measured by a pressure gauge 11. The I-P characteristic of the linear solenoid valve 7 is adjusted so that the measured signal pressure becomes equal to a pressure value corresponding to the predetermined current that has been supplied. In this case, the I-P characteristic is adjusted by turning a screw of the linear solenoid 7a to adjust a spring force within the linear solenoid 7a, and thus finely adjust an output oil pressure. Hence, adjustment of the I-P characteristic is troublesome and takes a long time.

On the other hand, one of the following four methods is used to adjust the I-P characteristic of the linear solenoid valve 7 in accordance with the present invention.

(d) A signal pressure output from the linear solenoid valve 7 is measured in the same manner as in the aforementioned related art. The I-P characteristic is also adjusted by turning the screw of the linear solenoid 7a to adjust a spring force within the linear solenoid 7a, as in the case of the related art. In this case, as in the aforementioned case where a current value of the ECU 3 is adjusted, since overall fine adjustment of the V/B ASSY 9 is carried out later by means of the ECU 3, the present invention adjusts the I-P characteristic relatively roughly as compared with the related art. A coarse adjustment (rough adjustment), rather than the fine adjustment of the prior art is made. Predetermined current and pressure values that have been measured (i.e., values of the I-P characteristic) are not stored in either the ECU 3 or the storage medium 16.

As previously described, adjustment of the I-P characteristic of the linear solenoid valve 7 is carried out as a coarse adjustment. Thus, the linear solenoid valve 7 can be made less expensively as compared with the related art, and the I-P characteristic of the linear solenoid valve 7 can be adjusted more easily and more quickly as compared with the related art.

(e) A signal pressure output from the linear solenoid valve 7 is measured in the same manner as in the aforementioned related art and the I-P characteristic is adjusted in the same manner as in the aforementioned method (d). However, predetermined current and pressure values that have been measured (i.e., values of the I-P characteristic) are stored in the ECU 3 or the storage medium 16 as characteristic values. In this case as well, adjustment of the I-P characteristic of the linear solenoid valve 7 is carried out as a coarse adjustment. Thus, the linear solenoid valve 7 can be made less expensively as compared with the related art, and the I-P characteristic of the linear solenoid valve 7 can be adjusted more easily and more quickly.

(f) A signal pressure output from the linear solenoid valve 7 is measured in the same manner as in the aforementioned related art. However, since overall fine adjustment of the V/B ASSY 9 is carried out by means of the ECU 3, the I-P characteristic is not adjusted. In this case, predetermined current and pressure values that have been measured (i.e., values of the I-P characteristic) are stored in the ECU 3 or the storage medium 16. Thus, the screw need not be turned to adjust the I-P characteristic. As a result, a further reduction in time can be achieved as compared with the aforementioned case where rough adjustment of the I-P characteristic is carried out.

(g) Because overall fine adjustment of the V/B ASSY 9 is carried out by means of the ECU 3, neither measurement of a signal pressure output from the linear solenoid valve 7 nor adjustment of the I-P characteristic is required. Therefore, manufacture time can be yet further reduced as compared with the aforementioned case involving rough adjustment of the I-P characteristic. In this case, in addition to simple elimination of measurement and adjustment, adjustment the I-P characteristic of the linear solenoid valve 7 in the linear line LL can also be eliminated.

In the subsidiary line SL, the frictional engagement elements 4 such as the clutches, the brakes and the like of the A/T 2, the return spring SP 5, and the hydraulic servo 6 are assembled. Here, friction plates 4a of the frictional engagement elements 4 are selected from among different types depending on the type of the A/T 2. The return spring SP 5 is installed in a compressed state between a piston 6a and a retainer 6b of the hydraulic servo 6.

Before the finished product is inspected in the main line ML as will be described later, the spring load of the mounted return spring SP 5 (a set load of the SP 5) is measured, so that the actual value of the spring load is obtained. Also, the length of stroke "a" made by the piston 6a of the hydraulic servo 6 to a point immediately preceeding engagement of the frictional engagement elements 4 is measured, so that the actual value of the piston stroke "a" is obtained.

A method of measuring a spring load of the return spring SP 5 (a set load of the spring SP 5) according to the present invention will now be described.

In the inspection system 1 of the A/T 2 of the present invention, the actual value of a spring load of the return spring SP 5 is measured, for example, by direct measurement with a load gauge (not shown) such as a load cell or the like or by multiplying the spring constant of the return spring SP 5 measured in advance as the distance between the piston 6a and the retainer 6b. As a matter of course, the actual value of the spring load of the return spring SP 5 can be obtained according to other known methods as well. In the related art, the spring load of the return spring SP 5 (a set load of the SP 5) is neither measured nor adjusted.

Preliminary to description of a method of measuring the piston stroke "a" of the hydraulic servo 6 according to the present invention, a method of measuring the piston stroke "a" of the hydraulic servo 6 utilized by the related art will be described. A plurality of cushion plates 4b (shown in FIG. 1) that are of different types, i.e., inclined slightly differently from one another, are prepared for use as different frictional engagement elements such as clutches, brakes, and the like. After a frictional engagement element ASSY has been fabricated employing one of the cushion plates 4b presumed most suitable, the piston stroke "a" is measured. The actual value of the piston stroke "a" is obtained by measuring in advance an air pressure at the time when the cushion plate 4b and the return SP 5 are completely compressed and the air pressure when completely relaxed, by means of a dial gauge (not shown).

If the actual value of the piston stroke "a" is within a predetermined range set in advance, the piston stroke "a" is regarded as acceptable and is not further adjusted. If the actual measured value of the piston stroke "a" is not within the predetermined range, a cushion plate 4b having a different inclination is selected and substituted, and stroke of the piston 6a is measured again by the same method. By repeated selective substitution of cushion plates 4b of different inclinations the measured value of the piston stroke "a" is eventually brought within the predetermined range for the stroke. Adjustment of stroke according to the related art is made highly precise with the predetermined range being set as a relatively narrow range. Therefore, a large number of repetitions of selective substitution of the cushion plates 4b is required and it takes a long time to adjust the stroke.

On the other hand, in the inspection system 1 of the A/T 2 of the present invention, one of the following two methods is adopted for adjustment of the piston strokes of the frictional engagement elements 4.

(h) As in the above-described adjustment of a piston stroke according to the related art, the frictional engagement element ASSY is assembled, its piston stroke is measured, and selective substitution of the cushion plates 4b is repeated. In this case, since overall fine adjustment of the V/B ASSY 9 is carried out later by means of the ECU 3, adjustment of a piston stroke is carried out only to the extent of a coarse adjustment (rough adjustment) by broadening the aforementioned predetermined range, as compared with the relatively narrow range of the related art. The measured value of a stroke that is within the thus broadened predetermined range is stored in the ECU 3 or the storage medium 16. Thus, the number of repetitions of selective substitution of the cushion plates 4b can be reduced and the time required for adjustment of the stroke is also reduced as compared with the related art.

(I) As in the case of adjustment of piston stroke according to the related art described above, the frictional engagement element ASSY is assembled employing cushion plates 4b, presumably most suitable, and the piston stroke "a" is measured. In this case, since overall fine adjustment of the V/B ASSY 9 is carried out later by means of the ECU 3, adjustment of the stroke based on selective substitution of the cushion plates 4b as described above is entirely omitted. Actual measurements of stroke are stored in the ECU 3 or the storage medium 16. Since adjustment of stroke by trial and error plate substitution is entirely omitted, a still further reduction in time for inspecting the frictional engagement elements can be achieved, as compared with the aforementioned method (h) of rough adjustment.

Although not shown, measured actual values of spring load and piston stroke can also be checked and corrected using a spring load tester and a piston stroke tester (which together correspond to the parts tester of the present invention), respectively.

The subsidiary line SL also receives the linear solenoid valve 7 from the linear line LL and assembles various valves 8 into the V/B ASSY 9. The valves 8 are then adjusted by turning sleeves thereof. As in the foregoing case, since overall fine adjustment of the V/B ASSY 9 is later carried out by means of the ECU 3, adjustment of the valves 8 may be carried out more roughly as compared with the related art, i.e., as coarse adjustment (rough adjustment).

As described above, no more than coarse adjustment is required in adjusting the valves 8. Thus, the valves 8 can be made less expensively, i.e., more easily and more quickly, as compared with the related art.

The linear solenoid 7a of the V/B ASSY 9 and the ECU 3 received from the ECU line EL are integrated with each other or electrically connected to each other as separate components. In addition, a V/B tester 12 (which corresponds to the parts tester of the present invention) that is used for V/B ASSY inspection is electrically connected to the ECU 3, and the valves 8 of the V/B ASSY 9 are connected on the output side thereof to a pressure gauge 12a of the V/B tester 12. In this manner, the ECU 3 received from the ECU line EL and the V/B ASSY 9 are assembled and attached to the V/B tester 12.

The V/B tester 12 then implements a process of inspecting the V/B ASSY 9.

Figure 3A:
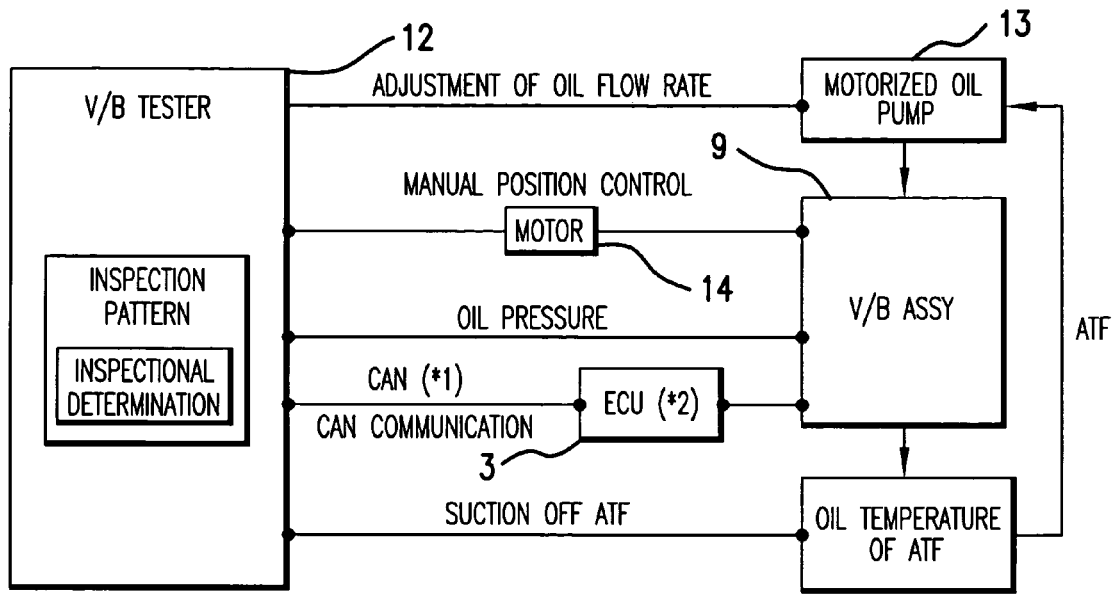
FIG. 3a illustrates inspection of a valve body assembly of the automatic transmission, more specifically a process of inspecting the valve body assembly while using and simultaneously inspecting a control unit.
Figure 3B:
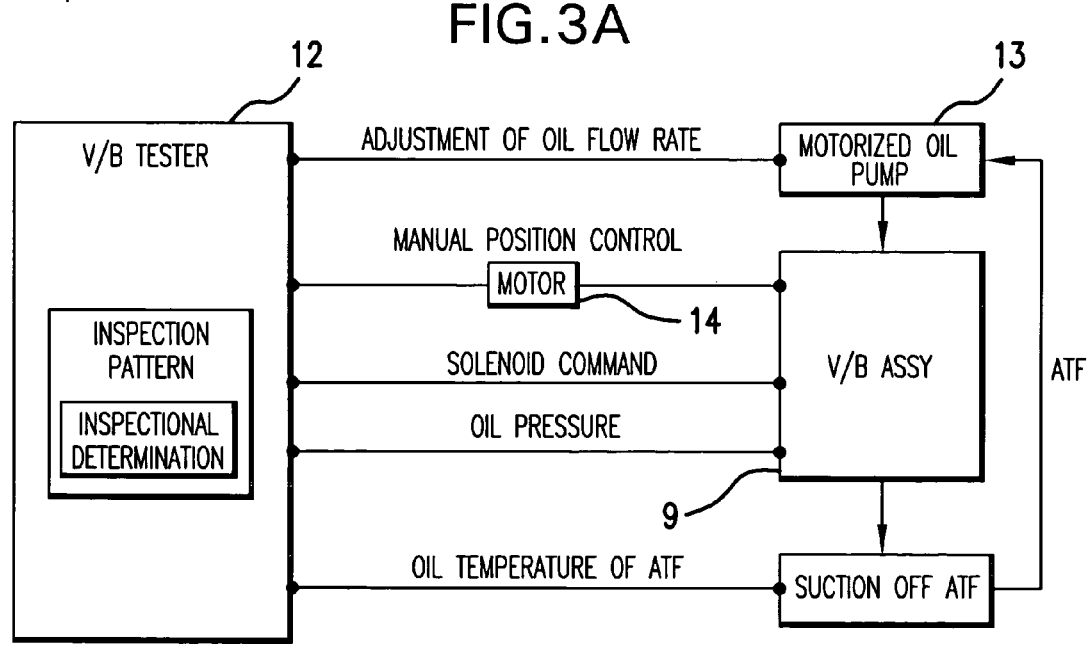
FIG. 3(b) shows a process of inspecting the valve body assembly according to the related art without using or simultaneously inspecting the control unit.

FIG. 3 shows an example of a system for implementing the process of inspecting the V/B ASSY 9. FIG. 3(a) shows the process of inspecting the V/B ASSY 9 according to the present invention while simultaneously inspecting the ECU 3. FIG. 3(b) shows the process of inspecting the V/B ASSY 9 according to the related art without using or simultaneously inspecting the ECU 3. The following description adopts, by way of example, a case where the characteristic value of the I-P characteristic in the linear line LL is stored in the storage medium 16 such as an ID card or the like.

Preliminary to the description of the process of inspecting the V/B ASSY 9 in the subsidiary line SL according to the present invention, the process of inspecting the V/B ASSY 9 according to the related art will be described. In the process of inspecting the V/B ASSY according to the related art, the system shown in FIG. 3(b) is adopted. In this related art system, the V/B ASSY 9 is inspected alone, without using or simultaneously inspecting the ECU 3.

That is, as shown in FIG. 3(b), the V/B ASSY inspection system of the related art is provided with the V/B tester 12, a motorized oil pump 13 that supplies the V/B ASSY 9 with oil for the A/T 2 (hereinafter referred to also as ATF), and a motor 14 for operationally controlling a manual valve (not shown) of the V/B ASSY 9 so as to control the position thereof.

Inspection pattern software and inspection determination software are stored in the V/B tester 12.

The motorized oil pump 13 is then electrically connected to the V/B tester 12 so as to adjust the flow rate of oil. For the purpose of controlling the position of the manual value, the motor 14 is electrically connected to the V/B tester 12, and the output shaft of the motor 14 is connected to the manual valve of the V/B ASSY 9. The V/B tester 12 and the V/B ASSY 9 are electrically connected to each other so as to output a solenoid drive command signal to the linear solenoid 7a of the V/B ASSY 9 from the V/B tester 12. In addition, the V/B tester 12 and the V/B ASSY 9 are electrically connected to each other to output an oil pressure signal to the V/B tester 12 indicative of the measured value of oil pressure generated in the V/B ASSY 9. Still further, the V/B tester 12 and the V/B ASSY 9 are electrically connected to each other so as to output to the V/B tester 12 a measurement data signal indicative of the oil temperature of the ATF at the intake of the motorized oil pump 13. In the V/B ASSY inspection system of the related art, there is no ECU 3 between the V/B tester 12 and the V/B ASSY 9.

In the V/B ASSY inspection system of the related art, the linear solenoid valve 7 is finely adjusted by turning the screw thereof while monitoring measured values of oil pressures in the V/B ASSY 9. A predetermined current value is then output from the V/B tester 12 to the linear solenoid 7a of the V/B ASSY 9. Then, the oil pressure output from the adjusted linear solenoid valve 7 to the V/B tester 12 at the current value is measured by the V/B tester 12. If the measured oil pressure is not within a predetermined range, spring forces of the valves 8 are finely adjusted by turning the sleeves thereof to, in turn, adjust the oil pressure.

In the V/B ASSY inspection system of the related art, the V/B ASSY 9 and the ECU 3 are separately adjusted. Therefore, even if the V/B ASSY 9 is finely adjusted, high-precision adjustment may not always be possible when the ECU 3 is connected to the V/B ASSY 9. Accordingly, the linear solenoid valve 7 and the valves 8 cannot be roughly adjusted. In other words, the linear solenoid valve 7 and the valves 8 need to be adjusted with higher precision and, as a result, the time required for adjustment is lengthened. Moreover, because the drive circuit of the ECU 3 is adjusted without simultaneously adjusting the V/B ASSY 9, it is inevitable that a relatively expensive component with relatively high precision must be employed as the drive circuit of the ECU 3.

In the related art, the A/T 2 and the ECU 3 are individually inspected. Therefore, even if each of the parts constituting the A/T 2 is manufactured with sufficient precision, the overall precision will vary depending on how those parts are combined, which leads to variation in the overall precision of the ECU integrated with the A/T.

On the other hand, as shown in FIG. 3(a), the system of inspecting the V/B ASSY 9 according to the present invention includes V/B tester 12, the motorized oil pump 13, and the motor 14 for operationally controlling the manual valve of the ASSY 9, as in the case of the related art. As in the foregoing description, the inspection pattern software and the inspection determination software are stored in the V/B tester 12.

For the purpose of exchanging data signals, the ECU 3 is connected to the V/B tester 12 in such a manner as to permit bidirectional communication based on CAN communication. The ECU 3 is electrically connected to the linear solenoid 7a so as to output a drive signal to the linear solenoid 7a of the V/B ASSY 9. Accordingly, unlike the case of the related art, the V/B tester 12 and the V/B ASSY 9 are not electrically connected to each other to transmit a solenoid drive command signal. Otherwise, the V/B tester 12 and the V/B ASSY 9 are connected in the same manner as in the aforementioned case of the related art shown in FIG. 3(b).

A drive command signal for the linear solenoid 7a is then output from the V/B tester 12 to the ECU 3 through CAN communication. On the other hand, a data signal indicating ATF oil temperature in the V/B ASSY 9, a data signal indicating rotational speed (turbine rotational speed (NT) or rotational speed of a component other than a turbine (NOUT)), a data signal indicating the manual position, value of the current flowing through the linear solenoid 7a, and failure information signals regarding these parameters are output from the ECU 3 to the V/B tester 12 through CAN communication.

Pieces of software that can be used in common in the process of inspecting the finished product and in the process of inspecting the V/B ASSY are installed in the ECU 3 as described above.

Furthermore, the valves 8 of the V/B ASSY 9 are connected on the output side thereof to the pressure gauge 12a (not shown in FIG. 3(a) but shown in FIG. 1), and oil pressures output from the valves 8 are introduced into the pressure gauge 12a.

In addition, a thermometer (not shown) for measuring temperature of the ATF from the V/B ASSY 9 is electrically connected to the V/B tester 12.

One of the following three methods is adopted for inspecting the V/B ASSY according to the present invention.

(j) The linear solenoid valve 7 used in the linear line LL according to the aforementioned method (e) is employed in the V/B ASSY 9. The V/B ASSY 9 and the ECU 3 are connected and attached to the V/B tester 12. The motorized oil pump 13 is driven in accordance with a drive signal transmitted from the V/B tester 12, with intake of ATF from the V/B ASSY 9. The ATF thus intaken is recirculated to the V/B ASSY 9. At this time, the V/B tester 12 adjusts flow rate of oil delivered by the motorized oil pump 13.

A current command value (an ideal value) as a solenoid drive command signal is transmitted from the side of the V/B tester 12 to the ECU 3 through CAN communication. Then, the ECU 3 outputs from the drive circuit thereof to the linear solenoid 7a of the V/B ASSY 9 an actual current value corresponding to the current command value transmitted from the V/B tester 12. Thus, the linear solenoid 7a is driven to output a signal pressure. The valves 8 of the V/B ASSY 9 adjust the oil pressure responsive to the signal pressure and output the adjusted pressure to the V/B tester 12.

The V/B tester 12 measures the oil pressure thus output by means of the pressure gauge 12a, compares the actually measured value with a pressure value corresponding to the current command value transmitted to the ECU 3, and makes a determination based on a detected difference between the actually measured value of the oil pressure and the pressure value based on the command value. The V/B tester 12 then calculates a characteristic value for correcting oil pressures according to the I-P characteristic, on the basis of the detected difference. In the process of inspecting the V/B ASSY, this characteristic value is transmitted to and written into the ECU 3, whereby a correction value is written into software for automatic gearshift control in the ECU 3. Thus, overall adjustment of oil pressures according to the I-P characteristic in the V/B ASSY 9 is executed by the ECU 3, and the ECU 3 and the V/B ASSY 9 are finely adjusted by software.

In order to confirm whether or not the characteristic value written into the software is correct, the V/B ASSY 9 itself, which is combined with the ECU 3, is inspected. If the characteristic value written into the software is correct, it is understood that the V/B ASSY 9 itself complies with a preset standard. Accordingly, the writing of a characteristic value into the ECU 3 in inspecting the V/B ASSY offers the advantage that the presence of a problem in a component of the A/T 2 other than the V/B ASSY 9 is specified if the A/T 2 is regarded as unacceptable (NG) in final inspection of the A/T 2. If the characteristic value written into the software is not correct, the aforementioned measurement is conducted again to recalculate a characteristic value, which is written into the ECU 3 in the process of inspecting the V/B ASSY.

In the process of inspecting the V/B ASSY according to the present invention, a signal indicating the detected temperature of the ATF in the V/B ASSY 9 is output to the V/B tester 12 via the ECU 3 through CAN communication. As in the case of the related art, a signal indicative of the temperature of the ATF at the inlet of the motorized oil pump 13 is output to the V/B tester 12 without the intervention of the ECU 3. Thus, two data signals representative of oil temperatures are output to the V/B tester 12, i.e., not only a detected ATF oil temperature but also the oil temperature detected by a sensor installed in the V/B ASSY 9. This makes it possible to determine that either the ECU 3 or the oil temperature sensor has suffered a failure, if an oil temperature obtained via the ECU 3 is greatly different from an oil temperature obtained without the intervention of the ECU 3. Incidentally, no particular problem results if only one of the two signals for detected oil temperatures is output to the V/B tester 12.

(k) In the aforementioned method (j), a characteristic value is written into the ECU 3 in the process of inspecting the V/B ASSY. In the process of inspecting the V/B ASSY according to this method (k), however, a characteristic value is stored in the storage medium 16, such as an IC card or the like, instead of being written into the ECU 3. When an actual (measured) value of spring force of the return spring SP 5 and an actual measured value of a stroke of the piston 6a in the hydraulic servo 6 are stored in the ECU 3 in the main line ML, the characteristic value is also written into the ECU 3. The other steps in the process of inspecting the V/B ASSY according to the method (k) are identical to those of the method (j).

In this manner, the number of times a characteristic value or actually measured values are written into the ECU 3 is limited to one, which offers the advantage that the time required for inspection can be reduced. In this case, however, the V/B ASSY 9 itself, which is combined with the ECU 3 into which the characteristic value has been written, cannot be inspected in the process of inspecting the V/B ASSY. Therefore, if the A/T 2 is found to be unacceptable (NG) in the final inspection thereof, it is unclear which part of the A/T 2 including the V/B ASSY 9 has a problem.

(m) A linear solenoid valve 7, which is different from the linear solenoid valve 7 according to the method (e) in the linear line LL which is employed in the aforementioned method (j), is employed in the V/B ASSY 9. The V/B ASSY 9 and the ECU 3 are connected and attached to the V/B tester 12. If a characteristic value has not already been stored in the ECU 3 or the storage medium 16 in the linear line LL, it is first read by the V/B tester 12 and then written therefrom into the ECU 3 (if a characteristic value has been stored in the ECU 3, this writing operation is not performed). Thereafter, inspection of the V/B ASSY is conducted substantially in the same manner as in the aforementioned method (h) or (i). A finally obtained characteristic value is written into the ECU 3. In this case, a characteristic obtained during inspection of the V/B ASSY is a characteristic of the V/B ASSY 9 itself.

According to the present invention, as described above, inspection of the V/B ASSY is conducted by means of the V/B tester 12 with the ECU 3 and the V/B ASSY 9 being connected to each other. Thus, the ECU 3 and the V/B ASSY 9 can be finely adjusted together. Thus, the coarse adjustment of the drive circuit of the ECU 3, subjected to the coarse adjustment of the linear solenoid 7a of the V/B ASSY 9, and variations in the valves 8 of the V/B ASSY 9 are corrected more finely and comprehensively. As a result, variations in the overall assembly of the ECU integrated with the A/T can be dealt with.

Because overall adjustment of the ECU 3 and the V/B ASSY 9 is carried out integrally by means of the ECU 3, the linear solenoid valve 7 and the valves 8 can be adjusted roughly as described above. Thus, the time required for adjustment of the linear solenoid valve 7 and the valves 8 can be reduced. Also, the incidence of rejected products can be reduced, and the direct run ratio can be increased. In addition, since the drive circuit of the ECU 3 can also be corrected, a drive circuit that is relatively low in precision and thus relatively inexpensive can be employed as above-described for ECU 3.

The V/B tester 12 of the present invention shown in FIG. 3(a) functions to select an inspection pattern for the V/B ASSY and to make a determination upon inspection of the V/B ASSY without using the ECU 3 as in the case of the related art, and is capable of not only inspecting the V/B ASSY in the ECU 3 integrated with the A/T but also of inspecting the V/B ASSY according to the related art. Namely, the V/B tester 12 is provided with a mechanism for selecting either inspection of the V/B ASSY in the ECU 3 integrated with the A/T or inspection of the V/B ASSY according to the related art.

More specifically, for the purpose of allowing inspection of the V/B ASSY to be conducted according to the related art, a solenoid drive command signal is transmitted via the ECU 3 through CAN communication instead of using a communication line of the V/B tester 12 of the related art shown in FIG. 3(b). This communication line is used to transmit a solenoid drive command signal, and is not present in the V/B tester 12 shown in FIG. 3(a), which is designed for inspection of the V/B ASSY.

Accordingly, the V/B tester 12 shown in FIG. 3(a) can be used to inspect the V/B ASSY in the ECU 3 integrated with the A/T as described above and to inspect the V/B ASSY in the A/T 2 according to the related art as well. Therefore, the working efficiency is enhanced, and the cost of development can be reduced by renovating conventional facilities.

Next, an exemplary method of comprehensively adjusting oil pressures according to the I-P characteristic in the V/B ASSY 9 by finely adjusting the ECU 3 and the V/B ASSY 9 together will be described.

Although the linear solenoid valve 7 supposedly exhibits a "linear" characteristic, the I-P characteristic thereof is not completely linear but slightly non-linear, from a microscopic point of view. Moreover, the I-P characteristic of the linear solenoid valve 7 is accompanied by hysteresis and differs depending on whether the current supplied to the linear solenoid 7a is increasing or decreasing. Hence, according to the present invention, oil pressures are adjusted according to the I-P characteristic of the V/B ASSY 9 by means of the ECU 3 with higher precision.

Figure 4A:
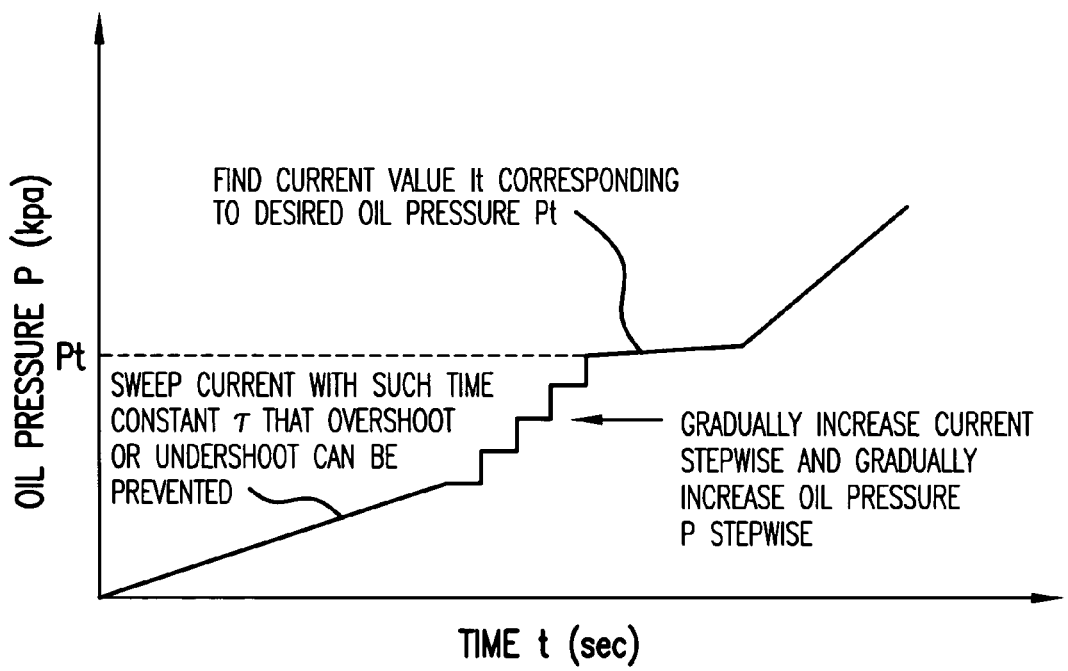
FIG. 4 illustrates adjustment of an oil pressure according to a current-oil pressure (I-P) characteristic of the valve body assembly of the automatic transmission.

That is, as shown in FIG. 4(a), in order to make the actual pressure value (an actually measured value of an oil pressure) equal to a desired oil pressure (a target oil pressure) Pt(kpa), the amount of current supplied to the linear solenoid 7a is gradually increased stepwise, so as to gradually increase oil pressure P(kpa) stepwise. Then, a desired current value It at the time when the actual pressure value has become equal to the desired oil pressure Pt(kpa) is found. By finding this current value It, a correction point for oil pressure can be defined as the actual pressure value Pt(kpa) at this moment. In this case, however, with a view to reducing the time required for the process of adjustment, the current supplied to the linear solenoid 7a is swept with a time constant $\tau$ of such a magnitude that the oil pressure follows without causing the actual pressure value to overshoot or undershoot, unless the desired current It is supplied to the linear solenoid 7a.

Figure 4B:
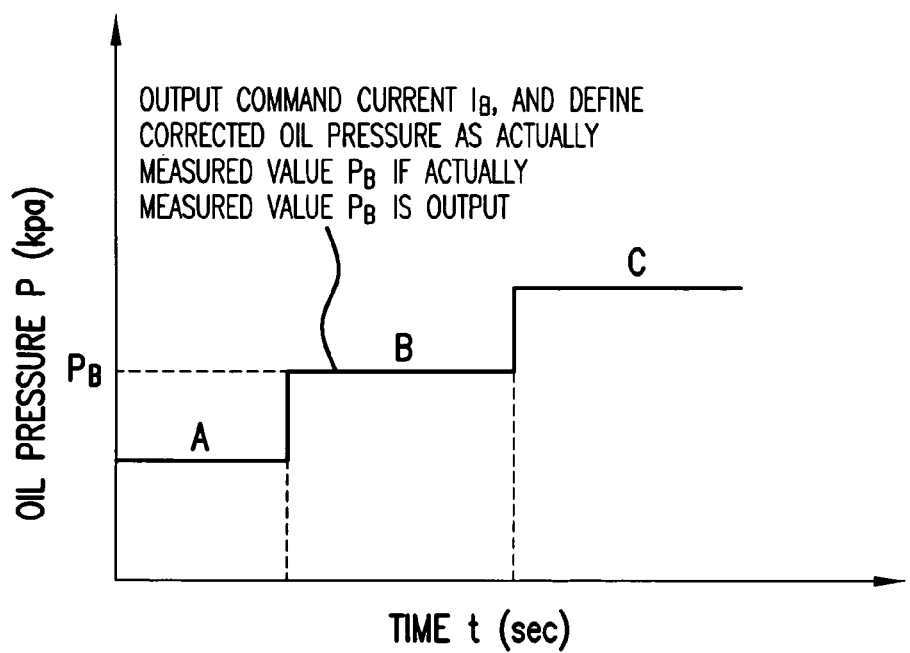

In the related art, as shown in FIG. 4(b), when a command current $I_B(A)$ supplied to the linear solenoid 7a is output at a given time, an actual pressure value $P_B(kpa)$ that has been output is defined as a correction point. However, as described above, the linear solenoid valve 7 exhibits a slightly non-linear characteristic accompanied by hysteresis. Therefore, if a high command current $I_B(A)$ is output at a given time, the desired oil pressure $P_B(kpa)$ is overshot, so that the actual pressure value that has been output may deviate from the desired oil pressure and become equal to $P_C(kpa)$. On the other hand, if a low command current $I_B(A)$ is output at a given time, the desired oil pressure $P_B(kpa)$ is undershot, so that the actual pressure value that has been output may deviate from the desired oil pressure and become equal to $P_A(kpa)$. Because these actual pressure values $P_A(kpa)$ and $P_C(kpa)$ are defined as correction points in the related art, high precision cannot be guaranteed.

According to the present invention, however, the actual pressure value Pt(kpa) can be defined as a correction point for oil pressure as described above. Therefore, oil pressures according to the I-P characteristic in the V/B ASSY 9 can be adjusted with higher precision. Thus, the sensation of a gearshift can be improved.

In some cases, the A/T 2 of the related art adopts a fast-fill control so as to reduce the period of the stoke of the piston 6a of the hydraulic servo 6 for the frictional engagement elements 4 such as the clutches, the brakes, and the like. To reduce the period of lost stroke which begins when the piston 6a starts making a stroke to the time when the frictional engagement elements 4 start to become engaged, the fast-fill control is designed to supply the hydraulic servo 6 with ATF relatively fast during the lost stroke period.

However, since the piston stroke "a" of the piston 6a varies depending on the precision of the components of the A/T 2, such as the frictional engagement elements 4, the hydraulic servo 6, and the like. Therefore, the piston stroke period also varies.

Thus, before the later-described final, finished-product inspection in the main line ML, a correction is made for an actually measured value of the piston stroke "a" obtained as described above. By the same token, before the finished-product inspection, the fast-fill period and the fast-fill oil pressure for supplying the hydraulic servo 6 with ATF are corrected with respect to a preset reference value (e.g., a median of a preset standard or the like), by means of the V/B tester 12, as described above. An engagement oil pressure based on these corrections is also corrected. This correction is made for the value of the piston stroke "a" as actually measured in advance. A correction value used in making this correction is written into the ECU 3.

Figure 5A:
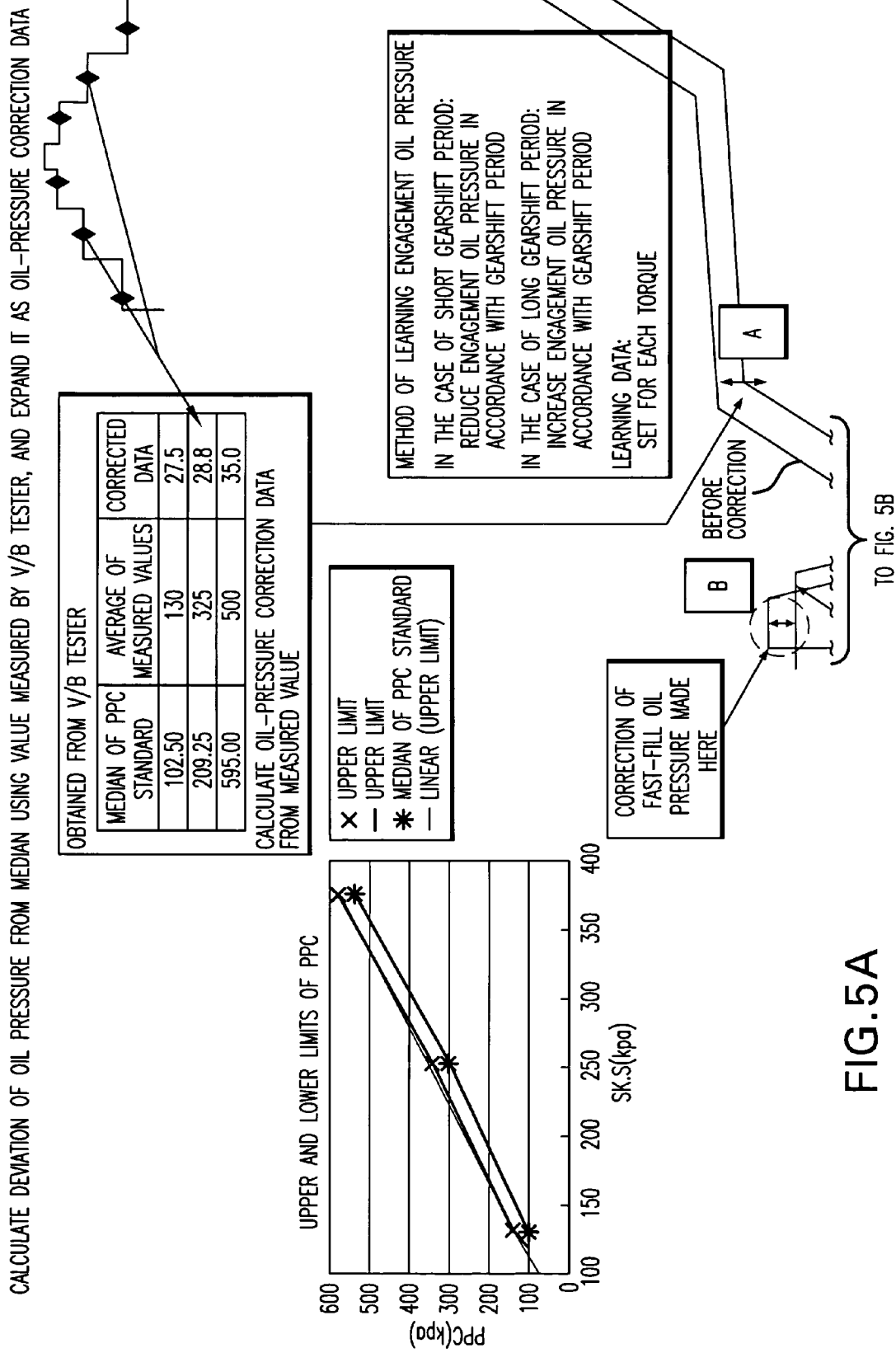
FIG. 5 illustrates correction of a fast-fill oil pressure during fast-fill control of supply of automatic transmission fluid (ATF) to a hydraulic servo.
Figure 5B:
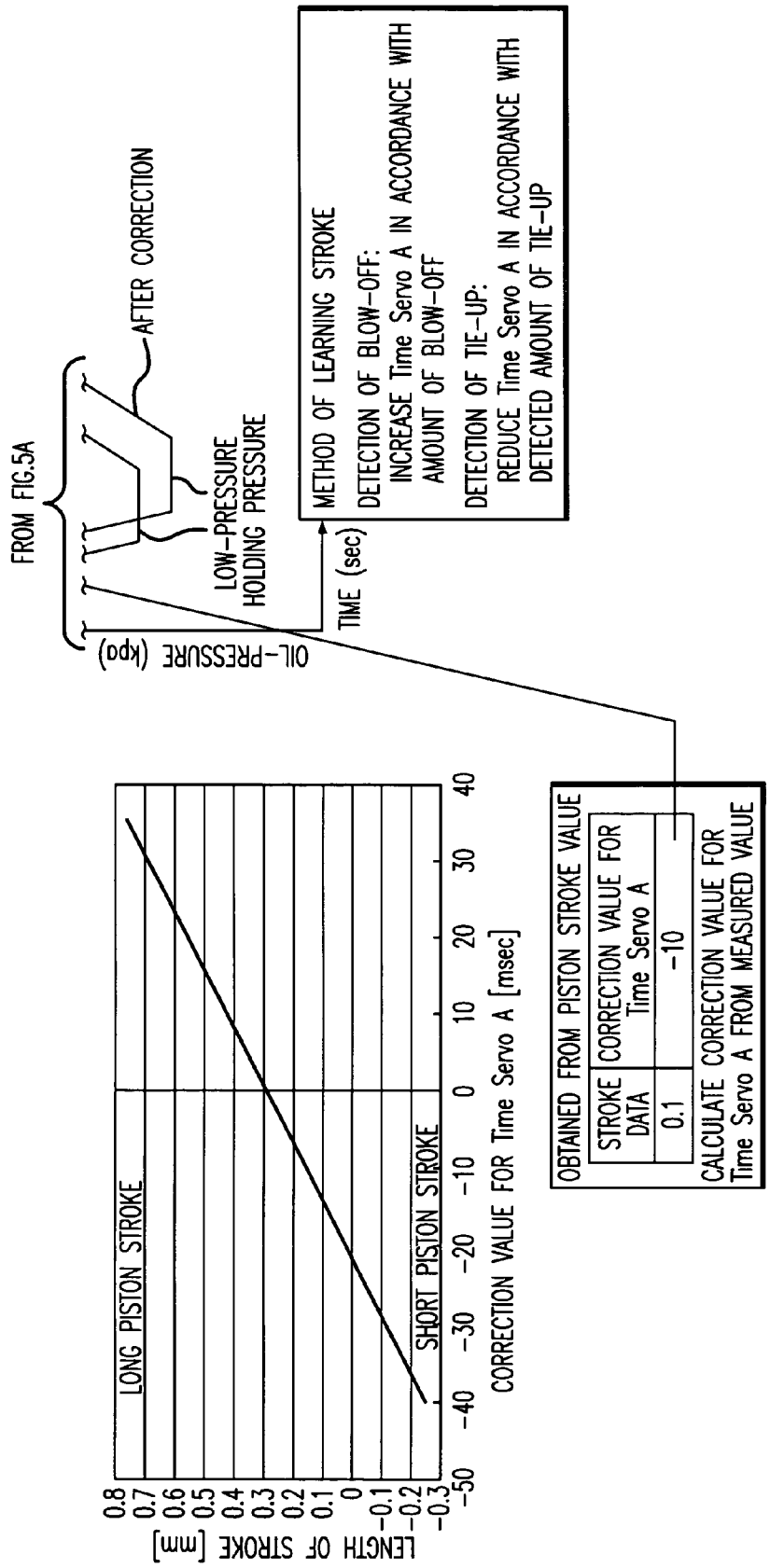

To be more specific, as shown in FIG. 5, an engagement oil pressure correction A is made as follows. An engagement oil pressure in the hydraulic servo 6 is measured by the V/B tester 12 as an oil pressure corresponding to a signal pressure SLS(kpa) of the linear solenoid 7a. This measurement of an oil pressure is conducted a predetermined number of times for a given signal pressure SLS(kpa), and the average of oil pressures thus obtained is defined as the measured value. A difference between the measured value and a median of a PPC standard corresponding to the signal pressure SLS(kpa) is calculated and expanded as oil pressure correction data. In the example shown in FIG. 5, three signal pressures SLS (kpa), namely, 130(kpa), 250(kpa), and 375(kpa), are measured.

If the signal pressure SLS(kpa) is equal to 130(kpa), the average of measured values is 130(kpa) and the median of the PPC standard is 102.50(kpa). Therefore, the difference between them, namely, 27.5(kpa) is regarded as a correction value. If the signal pressure (kpa) is equal to 250(kpa), the average of measured values is 325(kpa) and the median of the PPC standard is 296.25(kpa). Therefore, the difference between them, namely, 28.8(kpa) is utilized as the correction value. If the signal pressure SLS(kpa) is equal to 375(kpa), the average of measured values is 590(kpa and the median of the PPC standard is 555.00(kpa). Therefore, the difference between them, namely, 35.0(kpa) is taken as the correction value.

As shown in FIG. 5, the fast-fill period correction B is made as follows. Piston stroke "a" is measured by the V/B tester 12. This measurement of a piston stroke is carried out a predetermined number of times, and the average of the piston strokes "a" thus obtained is defined as the measured stroke value. A correction value (msec) for Time Servo A corresponding to the stroke data (mm) is calculated from the median shown in FIG. 5 according to a preset standard for stroke lengths (mm) and correction values (msec) for Time Servo A, and is expanded as a stroke correction value.

In the example shown in FIG. 5, the measured stroke is 6.1 mm. The correction value for Time Servo A at this moment is derived from the median according to the standard shown in FIG. 5 and turns out to be −16 msec. This period of −16 msec serves as a correction value for fast-fill periods.

As shown at the center on the right side of FIG. 5, during the fast-fill control at the beginning of introduction of ATF, the fast-fill period correction B is made. Namely, a fast-fill oil pressure is slightly reduced, whereby a fast-fill period is so corrected as to be prolonged and becomes equal to the aforementioned correction value. Thus, the corrected oil pressure is lower than an actually measured pressure by an amount corresponding to the reduction of the fast-fill oil pressure. The fluctuation of the oil pressure is also retarded for a period corresponding to the prolongation of the fast-fill period. After the fast-fill control has been terminated, the oil pressure remains in a low-pressure holding state until engagement of the frictional engagement elements is started. If the oil pressure then becomes equal to an engagement oil pressure, the engagement oil pressure correction A is made, so that the engagement oil pressure is corrected on the basis of the aforementioned correction value.

Engagement oil pressures and piston strokes are learned and stored in the ECU 3. A method of learning engagement oil pressures is as follows. If a gearshift period is relatively short, for example, the engagement oil pressure is reduced in accordance with the gearshift period. If a gearshift period is relatively long, the engagement oil pressure is increased in accordance with the gearshift period. This learning value is prepared for each gearshift torque. A method of learning a piston stroke is as follows. If blow-off of the engine is detected, a correction value (msec) for Time Servo A is increased in accordance with the detected amount of the blow-off. If tie-up is detected, a correction value (msec) for Time Servo A is reduced in accordance with the detected amount of tie-up. Learning values obtained from these learning methods are written into the ECU 3.

In this manner, a fast-fill period and a fast-fill oil pressure are corrected in advance, whereby a piston stroke period is made appropriate at an early stage of the gearshift control. Thus, the degree of variation in shift quality at the early stage can be reduced.

By making these corrections before the finished-product inspection of the A/T 2, the incidence of rejection of assemblies as failing to comply with the standards for the finished-product inspection can be reduced as well.

In addition, by measuring spring load of the return spring SP 5 and making the engagement oil pressure correction A or correcting an expected low pressure (shown in FIG. 5) of the hydraulic servo 6 by using the measured spring load, both the degree of variation in shift quality at the early stage and the incidence of rejected products as failing to comply with the standards of the finished-product inspection can further be reduced.

In the main line ML, the return spring SP 5, the frictional engagement element 4, such as a clutch or the like operate the hydraulic servo 6, and the V/B ASSY 9 are loaded on a pallet 15 and built into an A/T case 2a corresponding to the type of the A/T 2. Also, the ECU 3, which is electrically connected to the V/B ASSY 9, is integrated with the A/T case 2a. For the purpose of inspecting the V/B ASSY, it is also acceptable to temporarily separate the V/B ASSY 9 from the ECU 3, to build the V/B ASSY 9 into the A/T case 2a, to attach the ECU 3 to the A/T case 2a, and then to electrically connect the V/B ASSY 9 and the ECU 3 to each other. Thus, the A/T 2 with which the ECU 3 is integrated is fabricated into a finished product.

The actually measured value or the correction value of the spring load of the return spring SP 5 obtained as described above, the actually measured value or the correction value of the piston stroke "a" of the hydraulic servo 6 obtained as described above, and the data (i.e., the characteristic value of the A/T 2) for the hydraulic pressure according to the I-P characteristic of the linear solenoid valve 7 in the V/B ASSY 9 are stored in the storage medium 16 such as an ID card, a bar code, or the like. The storage medium 16 is loaded on the pallet 15 and corresponds to the type of the A/T 2.

The finished A/T 2 integrated with the ECU 3 and the storage medium 16 is carried on the pallet 15 to a finished-product inspection area in the main line ML.

For inspection of the finished products, an electric motor 17 is connected to and drives an input rotational shaft (not shown) of the A/T 2. The finished-product inspection tester 18, which is installed in the finished-product inspection area, is electrically connected to the ECU 3 integrated with the A/T 2 and the electric motor 17.

The finished-product inspection tester 18 inspects the A/T 2 as a finished product. In this finished-product inspection, data signals are exchanged between the ECU 3 and the finished-product inspection tester 18 through CAN communication. That is, in the finished-product inspection of the A/T 2, the aforementioned data stored in the storage medium 16 and composed of actually measured values obtained before the finished-product inspection or correction values corrected before the finished-product inspection are read, converted into control parameters, and stored in a server (not shown) of the finished-product inspection tester 18.

The data is read from the server by the finished-product inspection tester 18, transmitted to the ECU 3 through CAN communication, and then written into the ECU 3. A finished-product inspection pattern is transmitted from the finished-product inspection tester 18 to the ECU 3 through CAN communication.

A drive current following the finished-product inspection pattern is then supplied from the finished-product inspection tester 1810 the electric motor 17, the driving of which is controlled according to the inspection pattern. Thus, the A/T 2 is controlled according to the finished-product inspection pattern. Also, the ECU 3 utilizes the data written therein to operationally control the valves in the V/B ASSY 9 such as the linear solenoid valve 7 and the like according to the finished-product inspection pattern, and controls engagement and release of the frictional engagement elements, whereby inspection such as confirmation of a gearshift characteristic of the A/T 2 or the like may be conducted. In this case, since corrected data is used, there is almost no need for another correction. As a matter of fact, the final inspection involves only the inspecting of finished products.

The characteristic values of the A/T 2 such as the piston stroke, the oil pressure, the load of the return spring SP, and the like, as measured in the aforementioned process of inspection, may be stored in advance in the server of the finished-product inspection tester 18 for each type of A/T 2, with identification of those of the characteristic values in the server which are written into the storage medium 16 and which correspond to the type of the A/T 2 identified, and with the characteristic values identified in the process of inspecting finished products and written into the ECU 3.

By thus correcting the piston stroke, the oil pressure, the load of the return spring SP, and the like using the characteristic values of the A/T 2, the degree of variation in shift quality at the early stage can be reduced.

In addition, the serial number of the A/T 2 and characteristic values associated with the A/T 2 having that serial number are stored in the server of the finished-product inspection tester 18. Therefore, by writing the characteristic values into the ECU 3 in the assembly plant of the A/T 2, the A/T 2 and the ECU 3 can be corrected together.

In the case where the A/T 2 and the ECU 3 are inspected separately as in the related art, the aforementioned characteristic values of the A/T 2 are not stored in the ECU 3. However, in the case where the characteristic values of the A/T 2 are stored in the ECU 3, for example, in the case where the A/T 2 and the ECU 3 are inspected together, it is necessary to write the characteristic values of the A/T 2 into the ECU 3 in the process of measuring them. However, by writing the characteristic values stored in the server of the finished-product inspection tester 18 into the ECU 3 in the assembly plant of the A/T 2 as described above, it becomes unnecessary to write the characteristic values of the A/T 2 into the ECU 3 in the process of measuring them. As a result almost no restriction is imposed on the design of the assembly lines.

Figure 6A:
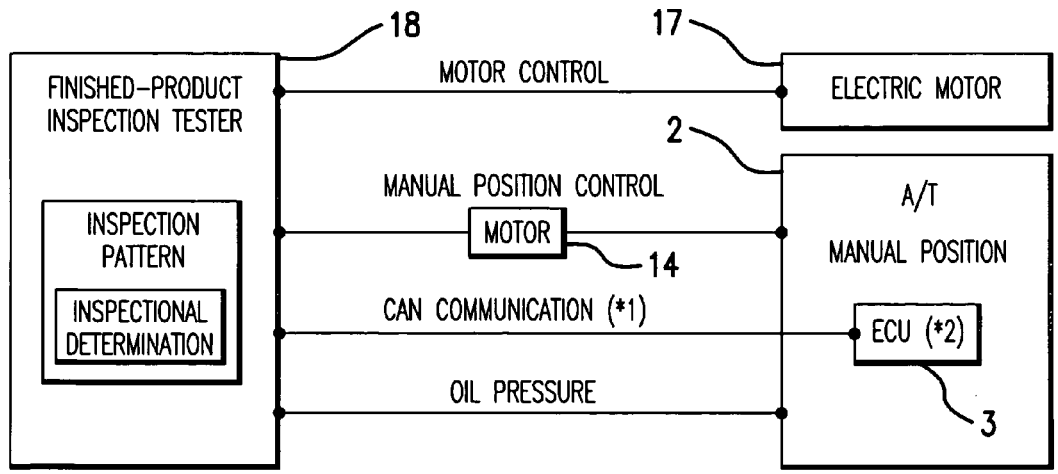
FIG. 6(a) shows a process of inspecting the finished product according to the present invention using and simultaneously inspecting a control unit.
Figure 6B:
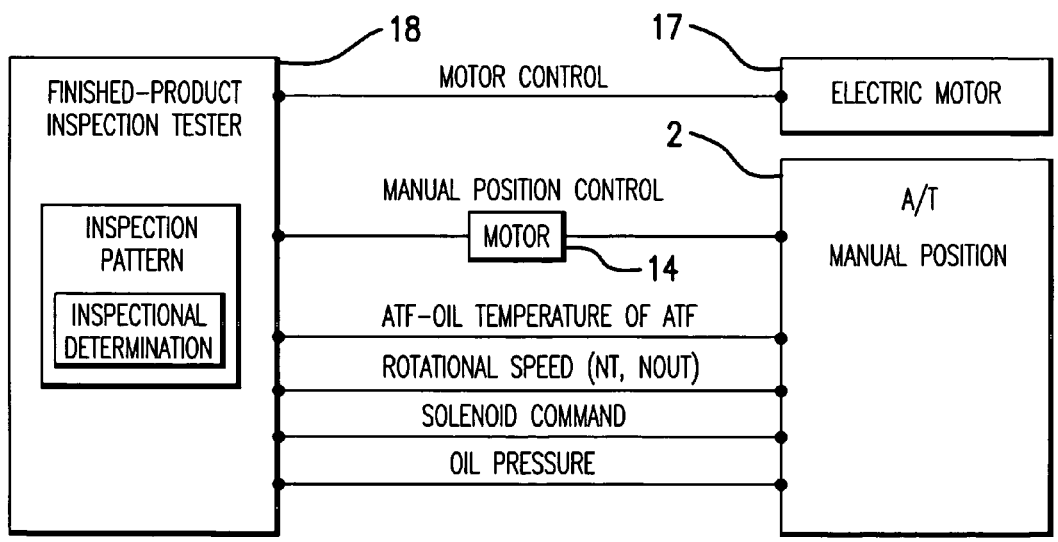
FIG. 6(b) shows a process of inspecting the finished product according to the related art without using or simultaneously inspecting the control unit.

FIG. 6(*a*) shows a system implementing the process of inspecting the A/T 2 as a finished product according to the present invention while using and simultaneously inspecting the ECU 3. FIG. 6(*b*) shows the process of inspecting the finished product according to the related art without using or simultaneously inspecting the ECU 3.

As shown in FIG. 6(*a*), the system implementing the process of inspecting the A/T 2 is provided with the aforementioned finished-product inspection tester 18, the electric motor 17 for driving the A/T 2 (i.e., for applying torque to the input shaft of the A/T 2), and the motor 14 for operationally controlling the manual valve of the V/B ASSY 9 in the A/T 2 so as to control its position.

As noted above, the inspection pattern software and the inspectional determination software are stored in the finished-product inspection tester 18.

For motor control, the electric motor 17 is electrically connected to the finished-product inspection tester 18. To control the manual position, the motor 14 is electrically connected to the finished-product inspection tester 18, and the output shaft of the motor 14 is connected to the manual valve of the V/B ASSY 9. In addition, for the purpose of exchanging data signals, the ECU 3 integrated with the A/T 2 is connected to the finished-product inspection tester 18 in such a manner as to permit bidirectional communication based on CAN communication.

In CAN communication, as in the aforementioned case of inspecting the V/B ASSY, a drive command signal for the linear solenoid 7*a* and a correction value for hydraulic pressures according to the I-P characteristic are output from the finished-product inspection tester 18 to the ECU 3. On the other hand, a data signal representative of temperature of the ATF in the V/B ASSY 9, a signal representative of rotational speed (NT, NOUT), a signal representative of manual position, a value of current flowing through the linear solenoid 7*a*, and failure information signals for these parameters are output from the ECU 3 to the finished-product inspection tester 18.

Moreover, as in the case of inspecting the V/B ASSY, the valves 8 of the V/B ASSY 9 are connected on the output side to a pressure gauge (not shown) of the finished-product inspection tester 18, and oil pressures output from the valves 8 are introduced into the pressure gauge.

In the process of inspecting finished products, as described above, the electric motor 17 is used to drive the A/T 2. At the same time, the finished-product inspection tester 18 controls the electric motor 17, and a current command value (an ideal value) is transmitted as a solenoid drive command signal from the finished-product inspection tester 18 to the ECU 3 through CAN communication. The ECU 3 then supplies the linear solenoid 7*a* of the V/B ASSY 9 with a current corresponding to the current command value transmitted from the side of the finished-product inspection tester 18. Thus, the linear solenoid 7*a* is driven, and the linear solenoid valve 7 outputs a signal pressure. The valves 8 of the V/B ASSY 9 are operated responsive to this signal pressure, and an oil pressure that has been adjusted in accordance with the signal pressure is output to the finished-product inspection tester 18.

The finished-product inspection tester 18 measures the oil pressure thus output by means of the pressure gauge 12*a*, compares the actually measured value with a pressure value corresponding to the current command value transmitted to the ECU 3, and determines the difference therebetween.

If the aforementioned difference is within a predetermined range set in advance, the A/T 2 is regarded as acceptable and shipped from the plant. On the other hand, if the aforementioned difference is not within the predetermined range set in advance, the A/T 2 is regarded as unacceptable and is not shipped from the plant. After the defective portion of the A/T 2 regarded as unacceptable has been identified, the A/T 2 is broken down into its component parts. The defective portion is corrected in the appropriate line SL, LL, and EL, and is then installed again in a A/T 2 that has been regarded as unacceptable. The data is again recorded in the storage medium 16 and read by the finished-product inspection tester 18 and the inspection proceeds in the same manner as described above. Because only the corrected data is used, only inspection is conducted.

In the process of inspecting the A/T 2 as a finished product according to the related art, the system shown in FIG. 6(*b*) is adopted. This system of the related art is different from the system of the present invention, and is designed to inspect the finished A/T 2 without using or simultaneously inspecting the ECU 3.

Unlike the aforementioned finished-product inspection system of the present invention, the A/T 2 inspection system of the related art is constructed without ECU 3 between the finished-product inspection tester 18 and the A/T 2, and with the finished-product inspection tester 18 and the V/B ASSY 9 of the A/T 2 electrically connected to each other so as to output a solenoid drive command signal from the finished-product inspection tester 18 to the linear solenoid 7*a* of the V/B ASSY 9 in the A/T 2. Further, the A/T 2 and the finished-product inspection tester 18 are electrically connected to each other so as to output a signal indicative of rotational speed of the turbine (NT) and a signal indicative of a rotational speed of a component other than the turbine. (NOUT) from the A/T 2 to the finished-product inspection tester 18. In addition, the A/T 2 and the finished-product inspection tester 18 are electrically connected to each other so as to output a signal for the ATF temperature from the A/T 2 to the finished-product inspection tester 18. Otherwise, the finished-product inspection tester 18 and the A/T 2 are connected in the same manner as in the present invention as shown in FIG. 6(*a*).

In the system for inspecting the A/T 2 as a finished product according to the related art, since the ECU 3 is not used, the A/T 2 cannot be inspected with high precision in some cases.

According to the present invention, however, since the ECU 3 and the A/T 2 are inspected together in the final inspection of the A/T 2, precision is high.

The finished-product tester 18 of the present invention shown in FIG. 6(*a*) functions to select an inspection pattern for the A/T and to inspect the A/T without using the ECU 3 as in the case of the related art, and is capable, not only of inspecting the ECU integrated with the A/T as a finished product according to the present invention, but also of inspecting the A/T as a finished product according to the related art. Namely, the finished-product inspection tester 18 is provided with a mechanism for selecting either inspection of the ECU 3 integrated with the A/T as a finished product or inspection of the A/T as a finished product according to the related art.

More specifically, for the purpose of inspecting the A/T finished according to the related art, a solenoid drive command signal is transmitted via the ECU 3 through CAN communication instead of using a communication line of the tester 18 of the related art shown in FIG. 6(*b*). This communication line is used to transmit a solenoid drive signal, and is not included in the finished-product inspection tester 18 shown in FIG. 6(*a*), which is designed for inspection of the ECU 3 integrated with the finished A/T.

Because the finished-product inspection tester 18 shown in FIG. 6(*a*) can be used to inspect the ECU 3 integrated with the A/T product as described above, and to inspect the A/T 2 product according to the related art as well, the working efficiency of the facilities can be enhanced, and the cost of development can be reduced by renovating the conventional facilities.

In the process of inspecting the A/T 2 finished product, characteristic values inherent in the A/T 2, namely, stroke-end oil pressure in the hydraulic servo 6 which operates the frictional engagement element 4 and oil pressure of an accumulator in an oil pressure control circuit of the A/T 2 are estimated on the basis of the oil pressure actually measured by the finished-product inspection tester 18.

Figure 7:
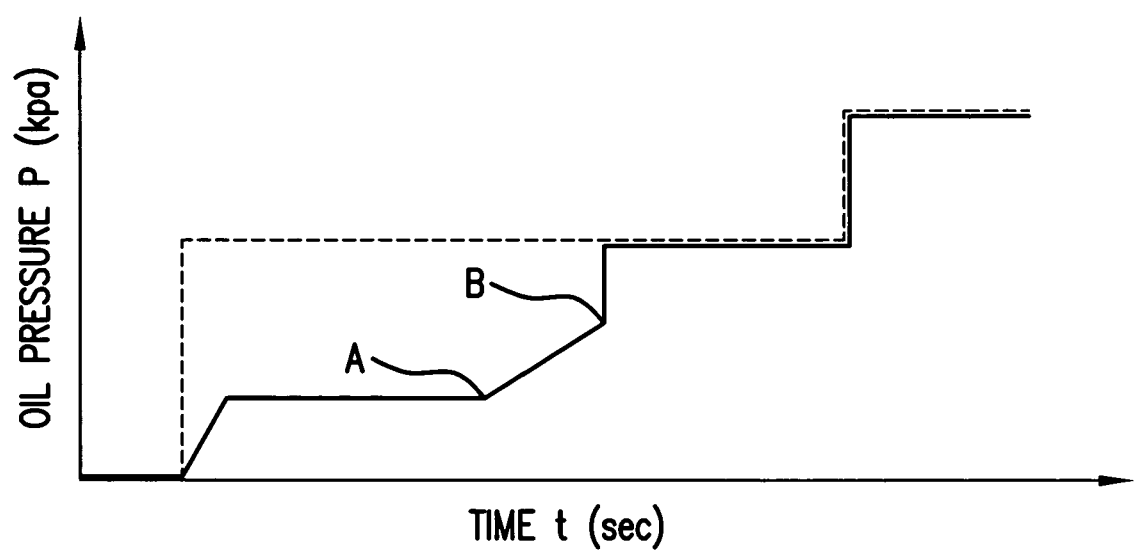
FIG. 7 illustrates estimation of a stroke-end oil pressure (stroke-end pressure) of a piston in the hydraulic servo and an accumulation-end oil pressure (accumulation-end pressure) of an accumulator in an oil pressure control circuit of the automatic transmission in accordance with an oil pressure value actually measured by a finished-product inspection tester.

The above-mentioned estimation of characteristic values is carried out as follows. While actual oil pressure is constantly monitored by the finished-product inspection tester 18, a solenoid current of a predetermined value, namely, a current corresponding to a current command value, is applied from the ECU 3 to the linear solenoid 7*a*. This current command value is set so that an oil pressure equal to or higher than the accumulation-end oil pressure is generated. The behavior (e.g., change with time) of the oil pressure generated in the linear solenoid valve 7, when the current corresponding to this current command value is applied to the linear solenoid 7*a*, is observed. For example, as shown in FIG. 7, the oil pressure first rises by a predetermined pressure and then becomes substantially constant. After a time "t" (sec) has elapsed, the oil pressure changes in gradient at a point A. After another time "t" has elapsed, the oil pressure changes again in gradient at a point B. The oil pressures at the points A and B are stored. The oil pressure at the point A is used for the actual gearshift control as a stroke-end pressure. The oil pressure at the point B is also used for the actual gearshift control as an accumulation-end pressure. In this case, both the stroke-end pressure and the accumulation-end pressure hardly vary.

In inspecting the A/T 2 as a finished product without simultaneously inspecting the ECU 3, i.e., the related art, characteristic values of the A/T, such as stroke-end pressure, accumulation-end pressure, and the like, are not stored in the ECU 3. Therefore, if the stroke-end pressure and accumulation-end pressure, that vary with precision of the components of the A/T 2, do not coincide with initial data stored in the ECU 3, problems such as a shock resulting from indraft, a long lag in time before the start of a gearshift, and the like result.

According to the present invention, however, a stroke-end pressure and an accumulation-end pressure that vary little are output at an early stage of the gearshift control. Inconsistency of shift quality as observed in the related art because of variations in stroke-end pressure and accumulation-end pressure, for example, shock from indraft, time lag before the start of a gearshift, and the like can be reduced.

By inspecting the A/T 2 as a finished product using the stroke-end pressure and the accumulation-end pressure, the incidence of rejection of articles failing to comply with the finished-product standard can be reduced as well.

In addition, by inspecting the ECU integrated with the A/T as a finished product, variation of actual current for a given current command value of the ECU 3 is also corrected.

Furthermore, by monitoring (checking) operation on the basis of an oil pressure as described above, it becomes unnecessary to measure degree of variance in components, for example, a degree of variance in the spring load of the return spring SP 5. Therefore, even if some parts are manufactured with relatively low precision, they can be used as well. Consequently, the A/T 2 can be manufactured at a low cost.

As previously described, since the ECU 3 and the A/T 2 are inspected together in the process of inspecting the A/T 2 as a finished product, the inspection has high precision. The ECU 3 and the V/B ASSY 9 are adjusted together with high precision by means of the ECU 3. Therefore, the A/T 2 is shipped from the plant only after a highly precise inspection and therefore has superior quality.

Characteristic values inherent to the A/T 2 which have been corrected and whose degrees of variance have been reduced, such as a shift time, piston stroke period, and the like are stored in the ECU 3 integrated with the A/T 2. By using such data during gearshift control, the A/T 2 can control the gearshift with high precision and can improve the sensation associated with a gearshift.

Moreover, the final inspection of the finished product uses values corrected in the process of inspecting the V/B ASSY. Thus, the degrees of variance in the characteristic values of the A/T 2 stored in the storage medium 16, e.g., the piston stroke period, and the like are reduced. As a result, an A/T 2 with more consistent shift quality can be produced without an increase in the incidence of rejection of the product. Besides, since the variation in shift quality has been reduced, the final inspection can be conducted with an FF control initial pressure during lock-up control being held more or less equal to a design value. Thus, stable inspection can be conducted. Further, in an actual vehicle, noise associated with lock-up slip is suppressed.

As previously described, the finished A/T 2 can be inspected with high precision. Therefore, almost no problem is encountered even if final inspection of the transmission is conducted without installing the A/T 2 in a vehicle. Accordingly, there is no need to dedicate space for inspection of the A/T 2 in the automobile plant.

Figure 8A:
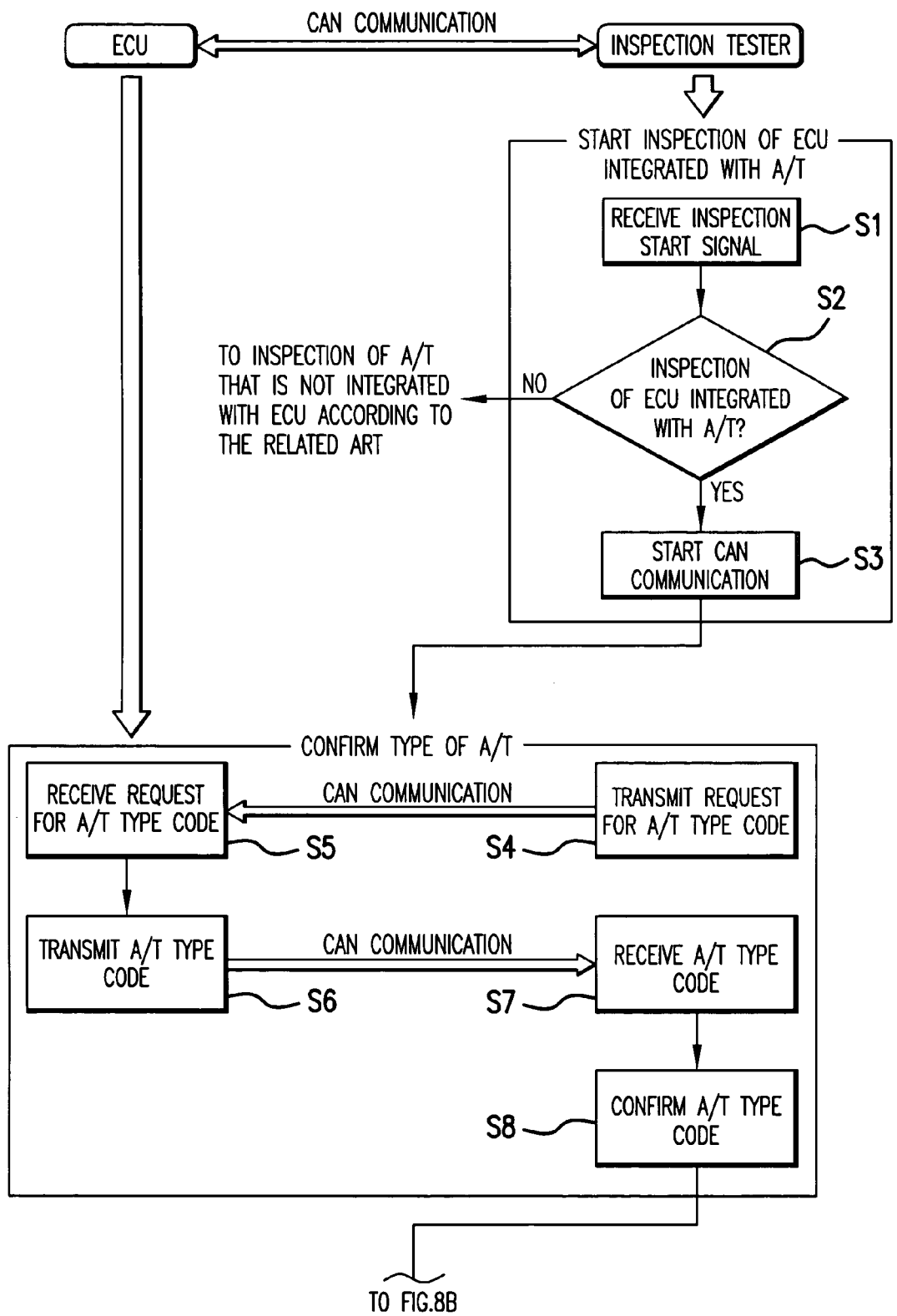
FIG. 8 shows an example of transmission of signals through CAN communication among an ECU, a V/B tester, and various inspection testers of the finished-product inspection tester in a process of inspecting the ECU which is integrated with the automatic transmission (A/T).
Figure 8B:
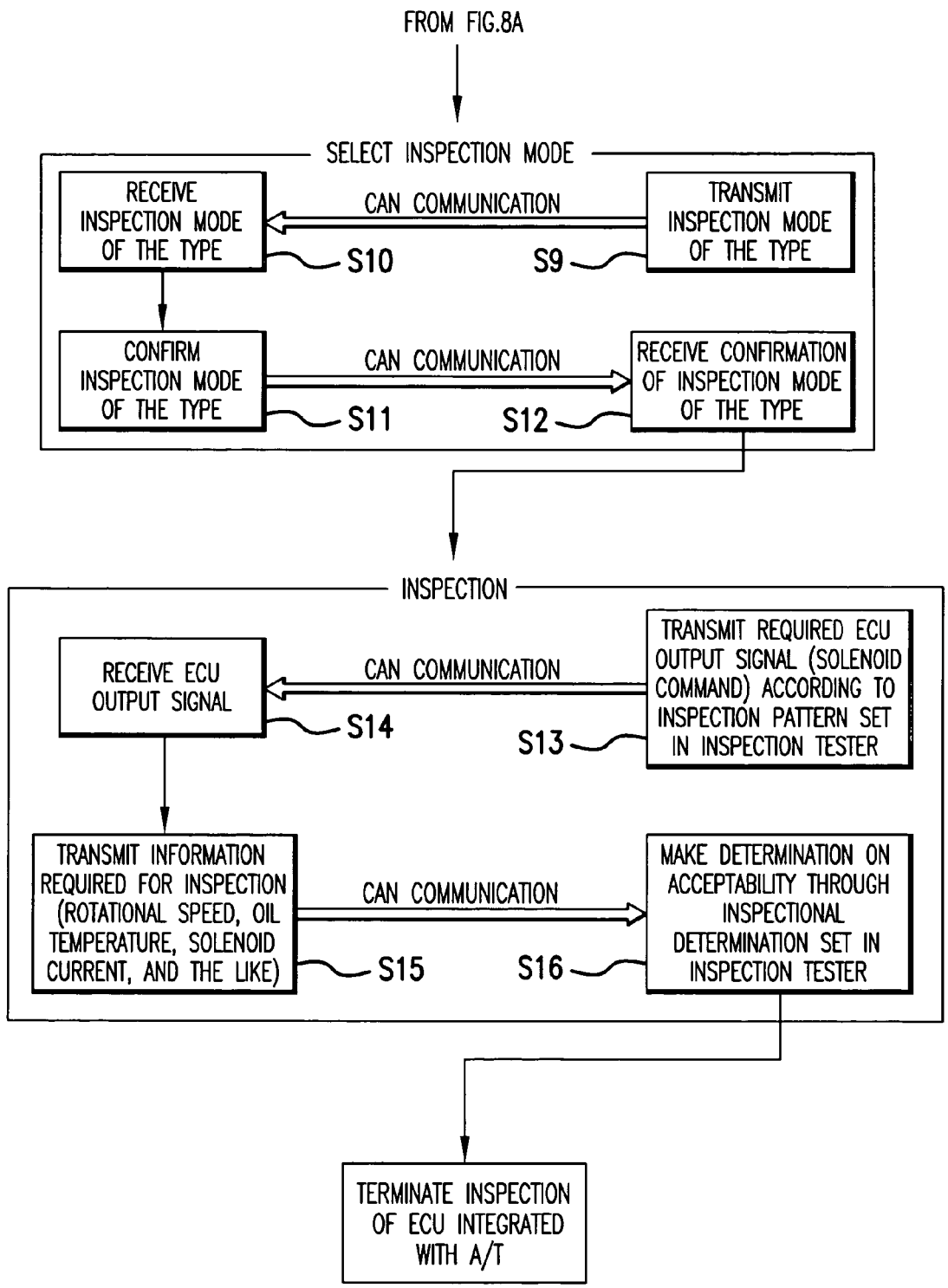

FIG. 8 shows an example of transmission of signals through CAN communication between the ECU 3 and each V/B tester 12 and finished-product inspection tester 18 in the process of inspecting the A/T 2 integrated with the ECU 3.

Referring to FIG. 8, process steps shown below the thick downward arrow on the left side are performed by the ECU 3, whereas process steps shown below a thick downward arrow on the right side are performed by the V/B tester 12 and the finished-product tester 18.

As for the inspection of the A/T 2 integrated with the ECU 3, the inspection of the V/B ASSY will be described first. In inspecting the V/B ASSY, as described above, the V/B tester 12 and the ECU 3 are electrically connected to each other, and signals are exchanged between the V/B tester 12 and the ECU 3 through CAN communication.

That is, the process of inspection of the ECU integrated with the A/T starts on the side of the V/B tester 12. In starting inspection of the ECU integrated with the A/T, if the V/B tester 12 receives an inspection start signal in step S1, it is determined in step S2 whether or not the ECU integrated with the A/T is to be inspected. If it is determined that the ECU integrated with the A/T is not to be inspected, the A/T 2 not integrated with the ECU 3 is inspected according to the related art.

If it is determined in step S2 that the ECU is to be inspected after integration with the A/T, CAN communication is started in step S3. Thus, a process of confirming the A/T type code is implemented on the sides of both the ECU 3 and the V/B tester 12. In step S4 in this process of confirming an A/T type code, an A/T type code request signal is transmitted through CAN communication from the V/B tester 12 to the ECU 3. Then in step S5, the ECU 3 receives the A/T type code request signal. In step S6, the A/T type code signal is transmitted from the ECU 3 to the V/B tester 12 through CAN communication. In step S7, the V/B tester 12 receives the A/T type code signal. In step S8, the V/B tester 12 confirms the A/T type code.

Thereby, a process of selecting an inspection mode is implemented on the sides of both the ECU 3 and the V/B tester 12. In step S9 of this process of selecting an inspection mode, an inspection mode signal corresponding to the type of the A/T, namely, a V/B ASSY inspection mode signal, is transmitted through CAN communication. Then in step S10, the ECU 3 receives the inspection mode signal corresponding to the type of the A/T. In step S11, the ECU 3 confirms the inspection mode for type of the A/T, that is, a V/B. ASSY inspection mode, and transmits a confirmation signal corresponding to the inspection mode to the V/B tester 12 through CAN communication. In step S12, the V/B tester 12 receives the confirmation signal corresponding to the mode for inspection of the A/T type.

A process of inspection is thereby implemented on the sides of both the ECU 3 and the V/B tester 12. In step S13 of this process of inspection, a required ECU output signal (i.e., a linear solenoid command signal), determined according to an inspection pattern set in the V/B tester 12, is transmitted from the V/B tester 12 to the ECU 3 through CAN communication. Then in step S14, the ECU 3 receives the ECU output signal. In step S15, the ECU 3 transmits items of information required for inspection (e.g., rotational speed, ATF temperature, current flowing through the linear solenoid, and the like) to the V/B tester 12 through CAN communication. In step S16, the V/B tester 12 refers to inspection criteria stored therein and determines on the basis of the items of information whether or not the V/B ASSY is acceptable. Thereby, inspection of the V/B ASSY, as part of the inspection of the ECU integrated with the A/T, is terminated. If it is determined as a result of the inspection that the V/B ASSY is unacceptable, a correction value in the aforementioned process of inspecting the V/B ASSY is calculated. This correction value is transmitted to the ECU 3 through CAN communication and written therein.

Next, finished-product inspection constituting part of inspection of the A/T 2 integrated with the ECU 3 will be described. In finished-product inspection, as described above, the finished-product tester 18 and the ECU 3 are electrically connected to each other, and signals are exchanged between the finished-product tester 18 and the ECU 3 through CAN communication.

That is, as shown in FIG. 8, the process of inspection of the ECU integrated with the A/T is started on the side of the finished-product inspection tester 18. In step S1 of this process of starting inspection of the ECU integrated with the A/T, the finished-product tester 18 receives an inspection start signal. Then in step S2, it is determined whether or not the ECU integrated with the A/T is to be inspected. If it is determined that the ECU integrated with the A/T is not to be inspected, the A/T 2 which is not integrated with the ECU 3 is inspected according to the related art.

If it is determined in step S2 that the ECU integrated with the A/T is to be inspected, CAN communication is started in step S3 to confirm the A/T type code on the sides of both the ECU 3 and the finished-product tester 18. In step S4 of this process of confirming the A/T type code, an A/T type code request signal is transmitted from the finished-product tester 18 to the ECU 3 through CAN communication. Then in step S5, the ECU 3 receives the A/T type code request signal. In step S6, the A/T type code signal is transmitted from the ECU 3 to the finished-product tester 18 through CAN communication. In step S7, the finished-product tester 18 receives the A/T type code signal. In step S8, the finished-product tester 18 confirms the A/T type code.

A process of selecting an inspection mode is implemented on the sides of both the ECU 3 and the finished-product inspection tester 18 and starts with step S9 in which a finished product inspection mode, an inspection mode signal corresponding to the type of the A/T, is transmitted from the finished-product tester 18 to the ECU 3 through CAN communication. Then in step S10, the ECU, 3 receives the inspection mode signal corresponding to the type of the A/T. In step S11, the ECU 3 confirms the inspection mode for the type of the A/T, and transmits a confirmation signal corresponding to the inspection mode to the finished-product tester 18 through CAN communication. In step S12, the finished-product tester 18 receives the confirmation signal corresponding to the inspection mode of the type of the A/T.

In step S13 of the inspection, an ECU output signal (i.e., a linear solenoid command signal), determined on the basis of inspection patterns stored in the finished-product tester 18, is transmitted from the finished-product tester 18 to the ECU 3 through CAN communication. Then in step S14, the ECU 3 receives the ECU output signal. In step S15, the ECU 3 transmits items of information required for inspection (e.g., rotational speed, ATF temperature, current flowing through the linear solenoid, and the like) to the finished-product tester 18 through CAN communication. In step S16, the finished-product tester 18 refers to inspection criteria stored therein and determines on the basis of the items of information whether or not the ECU integrated with the A/T is acceptable and inspection of the finished A/T product is terminated. If it is determined as a result of the inspection that the ECU integrated with the A/T is unacceptable, a correction value in the aforementioned process of inspecting the V/B ASSY is calculated. This correction value is transmitted to the ECU 3 through CAN communication and written therein.

To measure oil (ATF) pressure in the process of inspecting the V/B ASSY and the process of inspecting the A/T 2 as a finished product, as described above, it is confirmed whether or not a desired oil pressure has been generated for a predetermined current supplied to the linear solenoid 7a, which predetermined current is a value that is actually used during the control. In this case, an oil pressure value that has been smoothed, through sampling to account for fluctuation, is defined as a desired oil pressure value.

More specifically, a special filter such as a low-pass filter or the like is used in processing electric signals indicating actual values of oil pressures measured by the pressure gauge 12a of the V/B tester 12 and the pressure gauge of the finished-product inspection tester 18. Actual pressure values are thereby determined with reduction of the data variation during measurement.

For example, as shown in FIGS. 9($a$) and 9($b$), both on the oil-pressure increasing side and on the oil-pressure reducing side, measured data are smoothed 1250 to 1400 seconds after stoppage. The average of 126 actually measured values, that are obtained by reducing the degree of variation of the measured data by means of a low-pass filter of 5 Hz, is determined as a desired actual pressure value.

In determining an oil pressure in the A/T 2, if a method of measuring an oil pressure according to the related art wherein simply an average of sampled oil pressure values is used as an actual pressure value, for example, the following problems result. That is, the degree of variation in measurement is increased. Also, since an oil pressure is corrected on the basis of the actual pressure value thus determined, the error in making a correction is increased. Thus, the objective of reducing degree of variation in shift quality through correction cannot be fully realized. In the method of measuring an oil pressure according to the present invention, however, the degree of variance in the measured data is reduced. Therefore, the error in making a correction can be reduced, and the objective of uniformity of shift quality through the correction can be realized.

In addition, after inspection of the A/T 2 as a finished product has been completed, an A/T 2 deemed acceptable as meeting the test criteria is installed in the vehicle in the automobile plant and then is shipped. Subsequently, when the vehicle is actually driven with gearshift control, a characteristic of the A/T 2 is learned and a learning value of the characteristic is written into the ECU 3. Thus, even if the characteristic of the A/T 2 has changed with time after shipment of the A/T 2 from the plant, the ECU 3 controls the A/T 2 using the learned value and thereby effectively controls the gearshift to suppress gearshift shock.

Although the present invention is applied to an A/T in the aforementioned examples, the present invention is not limited thereto. The present invention is also applicable to a transmission other than an A/T, for example, a CVT or the like. The present invention is also applicable to power trains other than those mentioned in the foregoing description.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A power train inspection system for inspecting a power train comprising:
    a parts tester for testing and thereby acquiring characteristic values for parts constituting the power train before the parts are assembled into a power train which is inspected as a finished product;
    a storage medium for storing the characteristic values obtained from the parts tester; and
    a finished-product tester for inspecting the power train as a finished product, with the power train operated during testing in accordance with the characteristic values stored in the storage medium, and for judging the inspected power train as either acceptable or unacceptable based on the results of the inspecting.

2. The power train inspection system according to claim 1, wherein the power train as a finished product is an aggregate of assemblies each of which is an aggregate of single parts, and further comprising:

an assembly tester for acquiring characteristic values for those assemblies which are composed of parts for which characteristic values have not been acquired by the parts tester.

3. The power train inspection system according to claim 2, further comprising:

a control unit for controlling the power train, for acquiring the characteristic values and for storing the acquired characteristic values in correlation with the parts, the assemblies, and/or the power train as a finished product.

4. The power train inspection system according to claim 3, wherein the control unit is driven by a drive signal transmitted from the assembly tester, and acquires a characteristic value by outputting a control signal to a driven mechanism of an assembly in accordance with the drive signal, and the characteristic value is an oil pressure output from the driven mechanism responsive to the control signal.

5. The power train inspection system according to claim 4, wherein the characteristic values stored in the storage medium are written into the control unit before the power train as a finished product is inspected by the finished-product tester.

6. The power train inspection system according to claim 4, wherein the finished-product tester writes the characteristic values stored in the storage medium into the control unit while inspecting the power train as a finished product.

7. The power train inspection system according to claim 4, wherein the control unit is driven by a drive signal transmitted from the assembly tester, and acquires a characteristic value by outputting a control signal to a driven mechanism of an assembly in accordance with the drive signal, and the characteristic value is an oil pressure output from the driven mechanism responsive to the control signal.

8. A power train inspection system according to claim 3, wherein the finished product comprises the control unit integrated with the power train.

9. The power train inspection system according to claim 8, wherein the characteristic values stored in the storage medium are written into the control unit before the power train as a finished product is inspected by the finished-product tester.

10. The power train inspection system according to claim 8, wherein the finished-product tester writes the characteristic values stored in the storage medium into the control unit while inspecting the power train as a finished product.

11. The power train inspection system according to claim 3, wherein the control unit is driven by a drive signal transmitted from the assembly tester, and acquires a characteristic value by outputting a control signal to a driven mechanism of an assembly in accordance with the drive signal, and the characteristic value is an oil pressure output from the driven mechanism responsive to the control signal.

12. The power train inspection system according to claim 1, wherein the power train as a finished product is an aggregate of assemblies each of which is composed of single parts, and further comprising:

an assembly tester, wherein a characteristic value of at least one part belonging to one of the assemblies is acquired by the parts tester, and wherein characteristic values of the assemblies are acquired by the assembly tester using the characteristic value of the at least one part.

13. The power train inspection system according to claim 12, further comprising:

a control unit for controlling the power train, for acquiring the characteristic values and for storing the acquired characteristic values in correlation with the parts, the assemblies, and/or the power train as a finished product.

14. The power train inspection system according to claim 13, wherein the control unit is driven by a drive signal transmitted from the assembly tester, and acquires a characteristic value by outputting a control signal to a driven mechanism of an assembly in accordance with the drive signal, and the characteristic value is an oil pressure output from the driven mechanism responsive to the control signal.

15. The power train inspection system according to claim 14, wherein the characteristic values stored in the storage medium are written into the control unit before the power train as a finished product is inspected by the finished-product tester.

16. The power train inspection system according to claim 14, wherein the finished-product tester writes the characteristic values stored in the storage medium into the control unit while inspecting the power train as a finished product.

17. A power train inspection system according to claim 13, wherein the control unit is integrated with the power train.

18. The power train inspection system according to claim 1, further comprising:

a control unit for controlling the power train, for acquiring the characteristic values of the parts, and for storing the acquired characteristic values in correlation with the parts.

19. The power train inspection system according to claim 18, wherein the characteristic values stored in the storage medium are written into the control unit before the power train as a finished product is inspected by the finished-product tester.

20. The power train inspection system according to claim 18, wherein the finished-product tester writes the characteristic values stored in the storage medium into the control unit while inspecting the power train as a finished product.

21. A power train inspection system according to claim 18, wherein the finished product comprises the control unit is integrated with the power train.

22. The power train inspection system according to claim 1, further comprising:

a control unit for controlling the power train, and wherein the finished-product tester writes the characteristic values stored in the storage medium into the control unit while inspecting the power train as a finished product.

23. The power train inspection system according to claim 1:

wherein the parts comprise a piston, a return spring, a clutch drum, and a clutch plate;

wherein the power train as a finished product is an aggregate of assemblies;

wherein each of the assemblies is an aggregate of the parts.

24. A power train comprising:
a power train inspected by the power train inspection system according to claim 23; and
a control unit for controlling a power train inspected by the power train inspection system according to claim 23, wherein the control unit uses the characteristic values written therein to control a gearshift.

25. A power train according to claim 24, wherein the control unit is integrated with the power train.

26. The power train inspection system according to claim 1:
wherein the parts comprise a solenoid, a valve, and a valve body case;
wherein the power train as a finished product is an aggregate of assemblies; and
wherein at least one of the assemblies is a valve body assembly in the form of an aggregate of the parts.

27. A power train comprising:
the power train inspected by the power train inspection system according to claim 26; and
a control unit for controlling the inspected power train using the characteristic values written therein for gearshift control.

28. A power train comprising according to claim 27, wherein the control unit is integrated with the power train.

29. A power train according to claim 28, wherein the control unit uses the characteristic values written therein for gearshift control.

30. A power train according to claim 28, wherein the control unit is integrated with the power train.

31. A control unit for controlling a power train inspected by the power train inspection system according to claim 1, and having the characteristic values written therein, the control unit controlling the inspected power train by means of the characteristic values written therein.

32. A power train inspection system comprising:
a parts tester for acquiring characteristic values of parts constituting a power train before the parts are assembled into a power train which is inspected as a finished product;
a control unit for controlling the power train and storing the characteristic values obtained from the parts tester; and
a finished-product tester for inspecting the power train as a finished product, with the power train operated during testing in accordance with the characteristic values stored in the control unit, and for judging the inspected power train as either acceptable or unacceptable based on the results of the inspecting.

33. The power train inspection system according to claim 32,
wherein the power train as a finished product is an aggregate of assemblies including a valve body assembly;
wherein the assemblies are aggregates of single parts and the valve body assembly includes a solenoid, a valve, and a valve body case; and further comprising:
an assembly tester for acquiring characteristic values of assemblies which are composed of parts whose characteristic values have not been acquired by the parts tester.

34. The power train inspection system according to claim 33, wherein the characteristic values of the parts are stored within the control unit in correlation with the parts, the part assemblies, and/or the power train as a finished product.

35. The power train inspection system according to claim 34, wherein the control unit is driven by a drive signal transmitted from the assembly tester, and acquires a characteristic value by outputting a control signal to a driven mechanism of an assembly in accordance with the drive signal, and
the characteristic value is an oil pressure output from the driven mechanism responsive to the control signal.

36. The power train inspection system according to claim 32, wherein the power train as a finished product is an aggregate assemblies including a valve body assembly wherein the assemblies are aggregates of single parts and the valve body assembly includes a solenoid, a valve, and a valve body case; and further comprising:
an assembly tester for acquiring a characteristic value of at least one assembly using a characteristic value of at least one part.

37. The power train inspection system according to claim 36, wherein the characteristic values of the parts are stored within the control unit in correlation with the parts, the assemblies, and/or the power train as a finished product.

38. The power train inspection system according to claim 32, wherein the characteristic values of the parts are stored within the control unit in correlation with the parts, the assemblies, and/or the power train as a finished product.

39. The power train inspection system according to claim 32, wherein the power train as a finished product comprises an assembly which is an aggregate of parts including a piston, a return spring, a clutch drum, and a clutch plate.

40. The power train inspection system according to claim 32, wherein the power train as a finished product comprises a valve body assembly which is an aggregate of parts including a solenoid, a valve, and a valve body case.

* * * * *

UNITED STATES PATENT AND TRADEMARK OFFICE
CERTIFICATE OF CORRECTION

PATENT NO. : 7,289,892 B2
APPLICATION NO. : 10/739392
DATED : October 30, 2007
INVENTOR(S) : Akira Isogai et al.

It is certified that error appears in the above-identified patent and that said Letters Patent is hereby corrected as shown below:

Column 28, line 52 (claim 21, line 3), delete "is".

Column 30, line 26 (claim 36, line 3), "aggregate assemblies" should read -- aggregate of assemblies --.

Signed and Sealed this

Twenty-third Day of March, 2010

David J. Kappos
*Director of the United States Patent and Trademark Office*